US010262075B2

(12) United States Patent
Schaerges et al.

(10) Patent No.: US 10,262,075 B2
(45) Date of Patent: Apr. 16, 2019

(54) EFFICIENT NAVIGATION THROUGH HIERARCHICAL MAPPINGS

(71) Applicants: Hans-Peter Schaerges, Mannheim (DE); Bertram Beyer, Kronau (DE); Thomas Brueggemann, Mannheim (DE); Julia Heinrich, Wiesloch (DE)

(72) Inventors: Hans-Peter Schaerges, Mannheim (DE); Bertram Beyer, Kronau (DE); Thomas Brueggemann, Mannheim (DE); Julia Heinrich, Wiesloch (DE)

(73) Assignee: SAP SE, Walldorf (DE)

( * ) Notice: Subject to any disclaimer, the term of this patent is extended or adjusted under 35 U.S.C. 154(b) by 670 days.

(21) Appl. No.: 14/561,866

(22) Filed: Dec. 5, 2014

(65) Prior Publication Data

US 2016/0162598 A1   Jun. 9, 2016

(51) Int. Cl.
*G06F 17/30* (2006.01)
*G06F 3/0481* (2013.01)
*G06F 3/0482* (2013.01)

(52) U.S. Cl.
CPC ...... *G06F 17/30917* (2013.01); *G06F 3/0482* (2013.01); *G06F 3/04817* (2013.01);
(Continued)

(58) Field of Classification Search
CPC ............... G06F 3/067; G06F 17/30315; G06F 17/30734; G06F 2201/88; G06F 3/0638;
(Continued)

(56) References Cited

U.S. PATENT DOCUMENTS 5,421,008 A * 5/1995 Banning ........... G06F 17/30398
5,606,654 A * 2/1997 Schuur ..................... G09G 5/00
345/440

(Continued)

OTHER PUBLICATIONS

U.S. Appl. No. 14/305,239, filed Jun. 16, 2014, Schaerges et al.
U.S. Appl. No. 14/188,290, filed Feb. 24, 2014, Osterhoff et al.

*Primary Examiner* — Abdullah Al Kawsar
*Assistant Examiner* — Carl P Lobo
(74) *Attorney, Agent, or Firm* — Fish & Richardson P.C.

(57) ABSTRACT

The present disclosure relates to a computer-implemented method comprises displaying a first portion of a representation a first and a second hierarchical structure, each of the first hierarchical structure and the second hierarchical structure including a plurality of fields, displaying a representation of mappings between fields of the first hierarchical structure and the second hierarchical structure, receiving a predetermined user command associated with a particular field of the second hierarchical structure, in response to receiving the predetermined user command, if the displayed first portion of the representation of the first hierarchical structure includes no field mapped to the particular field of the second hierarchical structure, displaying a second portion of the first structure including at least one field mapped to the particular field of the second hierarchical structure, and, if the at least one field mapped to the particular field of the second hierarchical structure is hidden, expand the second portion of the first hierarchical structure until the at least one field mapped to the particular field of the second hierarchical structure becomes visible.

18 Claims, 13 Drawing Sheets

(52) U.S. Cl.
CPC .. *G06F 17/30221* (2013.01); *G06F 17/30554* (2013.01); *G06F 17/30589* (2013.01)

(58) Field of Classification Search
CPC .... G06F 3/0643; G06F 17/30286; G06F 8/75; G06F 17/30221; G06F 3/0481; G06F 17/30554; G06F 17/30589; G06F 17/30598; G06F 17/30601; G06F 17/3087; G06F 17/30011; G06F 19/24; G06F 17/301; G06F 17/30126; G06F 17/2241; G06F 17/30094; G06F 3/0482; G06F 11/1464; G06F 17/30398; G06F 17/30991; G06F 17/30994; G06F 3/04842; G06F 11/323; G06F 17/30572; G06F 17/30067; G06F 8/34; G06F 3/04817; G06F 3/04847; G06F 11/3636; G06F 17/30604; G06F 17/30914; G06F 17/30917; H04L 9/0836
See application file for complete search history.

(56) References Cited

U.S. PATENT DOCUMENTS

| | | | | |
|---|---|---|---|---|
| 5,761,656 | A * | 6/1998 | Ben-Shachar | G06F 17/3056 |
| 6,216,131 | B1 * | 4/2001 | Liu | G06F 17/30569 |
| 6,353,817 | B1 * | 3/2002 | Jacobs | G01S 7/52098 |
| | | | | 706/50 |
| 6,397,221 | B1 * | 5/2002 | Greef | G06F 17/30961 |
| 6,484,149 | B1 * | 11/2002 | Jammes | G06F 17/3089 |
| | | | | 705/26.62 |
| 6,665,677 | B1 * | 12/2003 | Wotring | G06F 17/30569 |
| 7,089,266 | B2 * | 8/2006 | Stolte | G06F 17/30592 |
| | | | | 707/769 |
| 7,162,484 | B2 * | 1/2007 | Grobler | G06F 17/3056 |
| 7,197,517 | B2 * | 3/2007 | Farrington | G06F 17/30595 |
| | | | | 707/797 |
| 7,272,594 | B1 * | 9/2007 | Lynch | G06F 17/2211 |
| 7,275,221 | B2 * | 9/2007 | McKeon | G06F 9/4443 |
| | | | | 707/999.101 |
| 7,376,898 | B1 * | 5/2008 | Yehuda | G06F 21/6218 |
| | | | | 709/225 |
| 7,418,456 | B2 * | 8/2008 | Charlet | G06F 17/30595 |
| 7,472,202 | B2 * | 12/2008 | Parupudi | G06F 17/3087 |
| | | | | 701/24 |
| 7,512,900 | B2 * | 3/2009 | Lynch | G06F 17/30663 |
| | | | | 715/708 |
| 7,644,361 | B2 * | 1/2010 | Wu | G06F 17/30572 |
| | | | | 715/273 |
| 7,681,130 | B1 * | 3/2010 | Lavallee | H04L 41/22 |
| | | | | 715/735 |
| 7,702,679 | B2 * | 4/2010 | Barber | G06F 17/2247 |
| | | | | 707/602 |
| 7,860,838 | B2 * | 12/2010 | Gupta | G06F 9/4428 |
| | | | | 707/651 |
| 8,041,739 | B2 * | 10/2011 | Glasgow | G06Q 10/10 |
| | | | | 707/791 |
| 8,103,703 | B1 * | 1/2012 | Jetter | G06Q 10/10 |
| | | | | 707/805 |
| 8,161,396 | B2 * | 4/2012 | Barber | G06Q 10/10 |
| | | | | 709/203 |
| 8,364,623 | B1 * | 1/2013 | Bunker | G06F 17/30572 |
| | | | | 706/23 |
| 8,370,224 | B2 * | 2/2013 | Grewal | G05B 19/05 |
| | | | | 705/29 |
| 8,386,430 | B1 * | 2/2013 | Myhill | G06F 11/1469 |
| | | | | 707/640 |
| 8,495,521 | B2 * | 7/2013 | Fried | G06F 17/2235 |
| | | | | 707/603 |
| 8,495,663 | B2 * | 7/2013 | Tien | G06Q 10/10 |
| | | | | 715/751 |
| 8,683,352 | B2 * | 3/2014 | Scherpa | G06F 17/30126 |
| | | | | 715/753 |
| 8,788,295 | B1 * | 7/2014 | Wargin | G06Q 40/08 |
| | | | | 705/4 |
| 8,850,304 | B2 * | 9/2014 | Ye | G06Q 30/08 |
| | | | | 715/224 |
| 8,898,197 | B2 * | 11/2014 | Senjalia | G06F 17/30489 |
| | | | | 707/797 |
| 9,058,168 | B2 * | 6/2015 | Rydenhag | G06F 1/3218 |
| 9,310,993 | B2 * | 4/2016 | Choi | |
| 9,372,837 | B2 * | 6/2016 | Alli | G06F 17/2247 |
| 9,396,282 | B2 * | 7/2016 | Creekbaum | G06F 17/212 |
| 9,396,455 | B2 * | 7/2016 | Mendelson | G06Q 10/10 |
| 2002/0010700 | A1 * | 1/2002 | Wotring | G06F 17/30014 |
| 2003/0105771 | A1 * | 6/2003 | Tiefenbrun | G06F 17/30126 |
| 2004/0059755 | A1 * | 3/2004 | Farrington | G06F 17/30595 |
| 2004/0193807 | A1 * | 9/2004 | Mogi | G06F 17/30286 |
| | | | | 711/137 |
| 2004/0193827 | A1 * | 9/2004 | Mogi | G06F 9/5083 |
| | | | | 711/170 |
| 2004/0212615 | A1 * | 10/2004 | Uthe | G06T 11/206 |
| | | | | 345/440 |
| 2004/0267694 | A1 * | 12/2004 | Sakai | G06F 17/30876 |
| 2005/0015732 | A1 * | 1/2005 | Vedula | G06F 8/34 |
| | | | | 715/805 |
| 2005/0049986 | A1 * | 3/2005 | Bollacker | G06Q 10/04 |
| | | | | 706/46 |
| 2005/0060343 | A1 * | 3/2005 | Gottsman | G06F 17/30696 |
| 2006/0005164 | A1 * | 1/2006 | Jetter | G06F 17/212 |
| | | | | 717/113 |
| 2006/0129569 | A1 * | 6/2006 | Dieberger | G06F 3/0482 |
| 2006/0173868 | A1 * | 8/2006 | Angele | G06F 17/30914 |
| 2006/0294191 | A1 * | 12/2006 | Marston | G06F 17/30528 |
| | | | | 709/206 |
| 2007/0189590 | A1 * | 8/2007 | Fidrich | A61B 90/36 |
| | | | | 382/128 |
| 2007/0260582 | A1 * | 11/2007 | Liang | G06F 17/30392 |
| 2008/0133622 | A1 * | 6/2008 | Brown | G06F 11/1458 |
| 2008/0215542 | A1 * | 9/2008 | Lim | G06F 17/30734 |
| 2008/0281819 | A1 * | 11/2008 | Tenenbaum | G06F 19/24 |
| 2009/0144137 | A1 * | 6/2009 | Moulton | G06Q 30/00 |
| | | | | 705/14.73 |
| 2009/0177634 | A1 * | 7/2009 | Behrendt | G06F 17/30 |
| 2009/0292718 | A1 * | 11/2009 | Cuneo | G06F 17/30398 |
| 2010/0223296 | A1 * | 9/2010 | Angus | G06F 17/30563 |
| | | | | 707/795 |
| 2010/0287208 | A1 * | 11/2010 | Mao | G06F 17/30604 |
| | | | | 707/803 |
| 2011/0093458 | A1 * | 4/2011 | Zheng | G06F 17/30241 |
| | | | | 707/724 |
| 2012/0131073 | A1 * | 5/2012 | Olney | G06F 17/2785 |
| | | | | 707/822 |
| 2012/0324347 | A1 * | 12/2012 | Monroe | G06F 17/2785 |
| | | | | 715/255 |
| 2013/0183649 | A1 * | 7/2013 | Monroe | G06F 17/24 |
| | | | | 434/322 |
| 2013/0275908 | A1 * | 10/2013 | Reichard | G06F 3/0481 |
| | | | | 715/777 |
| 2014/0046983 | A1 * | 2/2014 | Galloway | G06F 17/30958 |
| | | | | 707/798 |
| 2014/0068404 | A1 * | 3/2014 | Stiffler | G06Q 10/0639 |
| | | | | 715/227 |
| 2014/0122529 | A1 * | 5/2014 | Frieder | G06F 17/2241 |
| | | | | 707/778 |
| 2014/0214495 | A1 * | 7/2014 | Kutty | G06Q 10/0637 |
| | | | | 705/7.36 |
| 2014/0310605 | A1 * | 10/2014 | Basile | H04L 41/22 |
| | | | | 715/736 |
| 2014/0365525 | A1 * | 12/2014 | Pfeifer | G06F 17/30539 |
| | | | | 707/777 |
| 2015/0121025 | A1 * | 4/2015 | Wu | G06F 3/0665 |
| | | | | 711/162 |
| 2015/0242207 | A1 * | 8/2015 | Kuroda | G06F 8/75 |
| | | | | 717/123 |

* cited by examiner

EFFICIENT NAVIGATION THROUGH HIERARCHICAL MAPPINGS

TECHNICAL FIELD

The present disclosure relates to methods and systems for efficient navigation through mappings of hierarchical structures on graphical user interfaces. In particular, the present disclosure relates to computerized tools for database systems to check mappings of hierarchical structures.

BACKGROUND

Users of today's database systems can generate database models of real-world objects of considerable complexity. These objects can be hierarchical structures including hundreds and even thousands fields. One recurring task in operating a database system consists in mapping fields of multiple first database objects onto fields of a second database object. For instance, a user of a database system might wish to unify a first database object including last year's sales data and a second database object including this year's sales data into a new database object "overall sales data." To do so, the user maps the fields of the first and second (source) database objects to corresponding fields of the new (target) database object. During or after this procedure, the user might want to check if the database objects are properly mapped. Database systems can provide a visual representation of the mapped database structures based on which the user can check proper mapping. However, as the source and the target database objects can each involve hundreds or thousands of fields, checking the correct mapping can be cumbersome. In addition, graphically representing large hierarchical structures and their mappings (e.g., on a display of a user device) can require a substantial amount of computer resources. Therefore, the checking procedure might involve delays and latencies as, e.g., the user device might require perceptible amounts of time to retrieve and render representations of the database objects and their mappings.

SUMMARY

In a first general aspect of the present disclosure a computer-implemented method comprises displaying a first portion of a representation of a first hierarchical structure and a first portion of a representation of a second hierarchical structure, each of the first hierarchical structure and the second hierarchical structure including a plurality of fields which can be collapsed and expanded to hide or display fields of the hierarchical structure, displaying a representation of mappings between fields of the first hierarchical structure and the second hierarchical structure, receiving a predetermined user command associated with a particular field of the second hierarchical structure, in response to receiving the predetermined user command, if the displayed first portion of the representation of the first hierarchical structure includes no field mapped to the particular field of the second hierarchical structure, displaying a second portion of the first structure including at least one field mapped to the particular field of the second hierarchical structure, and, if the at least one field mapped to the particular field of the second hierarchical structure is hidden, expanding the second portion of the first hierarchical structure until the at least one field mapped to the particular field of the second hierarchical structure becomes visible and if the displayed first portion of the representation of the first hierarchical structure includes a hidden field mapped to the particular field of the second hierarchical structure, expanding the first portion of the first hierarchical structure until the at least one field mapped becomes visible.

In a second aspect according to the first aspect the method further comprises displaying a third portion of the representation of the first hierarchical structure including the at least one field mapped if the at least one field mapped to the particular field of the second hierarchical structure is not in the displayed area after the expanding step of the first portion or the second portion.

In a third aspect according to the first or second aspect the first hierarchical structure and the second hierarchical structure are database objects of a computerized database system In a fourth aspect according to any one of the first to third aspects the predetermined user command is a selection command of the particular field of the second hierarchical structure.

In a fifth aspect according to any one of the first to fourth aspects the method further comprises receiving a second predetermined user command associated with the particular field of the second hierarchical structure and in response to receiving the second predetermined user command displaying a fourth portion of representation of the first hierarchical structure including at least one second field mapped to the particular field of the second hierarchical structure and expanding the fourth portion of the first hierarchical structure until the at least one second field mapped to the particular field of the second hierarchical structure becomes visible if the at least one second field mapped to the particular field of the second hierarchical structure is hidden.

In a sixth aspect according to any one of the preceding aspects the method further comprises receiving further predetermined user commands associated with the particular field of the second hierarchical structure and in response to receiving the further predetermined user commands displaying further portions of first hierarchical structure including at least one further field mapped to the particular field.

In a seventh aspect according to any one of the preceding aspects the at least one field mapped to the particular field of the second hierarchical structure is a next field in the representation of the first hierarchical structure to the first portion of a representation of the first hierarchical structure currently displayed.

In an eighth aspect according to the seventh aspect the at least one second field mapped to the particular field of the second hierarchical structure is a next field in a downward direction in the representation of the first hierarchical structure.

In a ninth aspect according to any one of the preceding aspects the first hierarchical structure includes a plurality of further fields on a hierarchical level of the at least one field mapped to the particular field of the second hierarchical structure and expanding the second portion of the first hierarchical structure until the at least one field mapped to the particular field of the second hierarchical structure becomes visible includes displaying a predetermined number of fields of the plurality of further fields on the hierarchical level of the at least one field mapped in the vicinity of the at least one field mapped to the particular field of the second hierarchical structure and hiding the remaining fields of the plurality of further fields on the hierarchical level of the at least one field mapped in one or more sibling nodes In a tenth aspect according to the ninth aspect the method further receiving a user command associated with one of the one or more sibling nodes and expanding the one of the one or more sibling nodes to display one or more of the hidden fields on the hierarchical level of the at least one field mapped to the particular field of the second hierarchical structure.

In an eleventh aspect according to any one of the ninth or tenth aspect the predetermined number of fields displayed is zero or between 1 and 10.

In a twelfth aspect according to any one of the preceding aspects the method further comprises receiving a second predetermined user command associated with a particular field of the second hierarchical structure, in response to receiving the second predetermined user command expanding all portions of the first hierarchical structure including fields mapped to the particular field of the second hierarchical structure.

In a thirteenth aspect according to any one of the preceding aspects the method further comprises receiving a third predetermined user command associated with a particular field of the second hierarchical structure, in response to receiving the third predetermined user command highlighting all fields mapped to the particular field of the second hierarchical structure.

In a fourteenth aspect according to any one of the preceding aspects displaying the first portion or the second portion includes indicating connections between fields of the first hierarchical structure mapped to fields of the second hierarchical structure.

In a fifteenth aspect according to the fourteenth aspect connections between the particular field of the second hierarchical structure and fields of the first hierarchical structure are highlighted.

In a sixteenth aspect according to the fifteenth aspect highlighting involves changing a line type, line color, or both of a connection between fields.

In a seventeenth aspect according to any one of the preceding aspects the method further comprises receiving a predetermined user command associated with the particular field of the second hierarchical structure, in response to receiving the predetermined user command displaying a first portion of a representation of a third hierarchical structure, wherein the third hierarchical structure includes a plurality of fields, wherein at least one field of the third hierarchical structure is mapped onto the particular field of the second hierarchical structure, displaying a representation of mappings between fields of the third hierarchical structure and the second hierarchical structure and if the at least one field of the third hierarchical structure mapped to the particular field of the second hierarchical structure is hidden, expand the first portion of the third hierarchical structure until the at least one field mapped is visible.

In an eighteenth aspect according to the seventeenth aspect the method further comprises displaying the second portion of the first structure and the first portion of the third structure simultaneously.

In a second general aspect of the present disclosure a computer readable medium storing instructions thereon which when executed by a processor cause the processor to perform operations of any one of the first to eighteenth aspects.

In a third general aspect of the present a System comprises one or more processors and a computer-readable medium storing instructions executable by the one or more processors to perform operations comprising operations of any one of the first to eighteenth aspects.

BRIEF DESCRIPTION OF THE DRAWINGS

Like reference numbers and designations in the various drawings indicate like elements.

DETAILED DESCRIPTION

Figure 1:
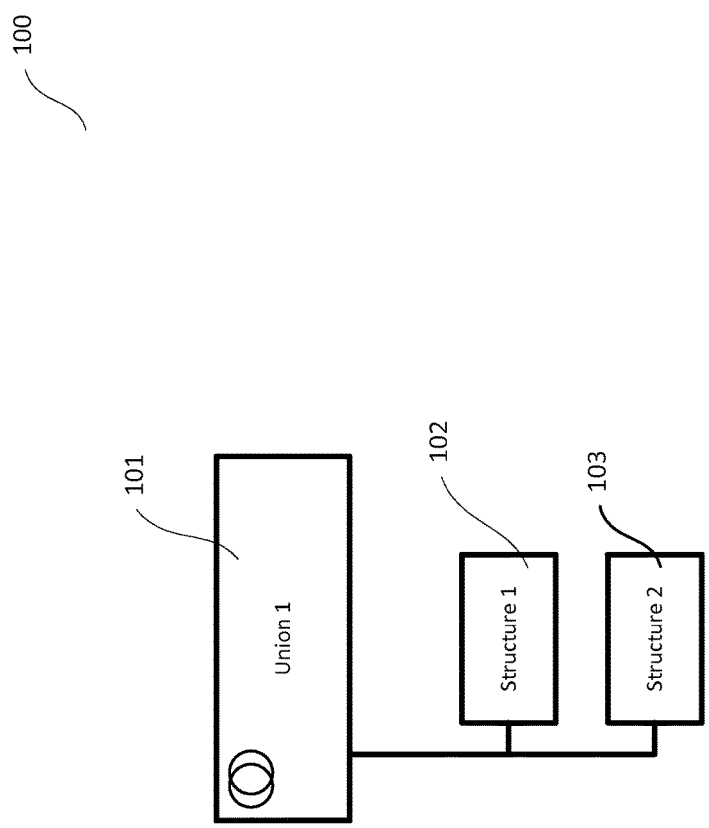
FIG. 1 illustrates the relationship between three example hierarchical structures according to an implementation.

The present disclosure relates to methods and systems for efficient navigation through mappings of hierarchical structures on graphical user interfaces. In particular, the present disclosure relates to computerized tools for database systems to check mappings of hierarchical structures.

The subject matter described in this disclosure can be implemented in particular embodiments so as to realize one or more of the following advantages:

First, the methods and systems of the present disclosure can provide for efficient navigation through mapped hierarchical structures (e.g., database objects).

Second, the methods and systems of the present disclosure can minimize a number of user actions to visualize the mappings of a particular field of the hierarchical structure.

Third, the methods and systems of the present disclosure can reduce a rendering load of a processor of a user device displaying the representations of mapped hierarchical database structures. For instance, a field of a hierarchical structure can be mapped to hundreds of fields in other hierarchical structures. If a couple dozen fields are visible on a display of a user device, this can include thousands of connections to mapped fields emanating from the displayed fields. Rendering this representation can take a substantial amount of time (e.g., a second or seconds) even on today's powerful user devices. This delay can impair a seamless user experience. The methods and systems of the present disclosure can reduce the number of times a new representation has to be rendered while checking the mappings of a particular field of the hierarchical structure.

Fourth, the navigation through representations of hierarchical structures can be facilitated by the methods and systems of the present disclosure as the hierarchical structures can be expanded in a screen-space efficient and economic way. A user might want to expand a layer of a hierarchical structure to check the mappings of a particular field. However, this might involve a large number of expansion steps in a complex structure. On the other hand, the representation of the hierarchical structures can grow enormously if all levels are automatically expanded. Then, it can take a considerable amount of time (and again rendering time) to navigate through the expanded structures. This time can be reduced by the methods and systems of the present disclosure by expanding only parts of a hierarchical structure at a time.

Fifth, the methods and systems of the present disclosure can provide for a systematic sequential navigation through all mapped fields of a particular field requiring only a single repeated user interaction.

In the present disclosure, a hierarchical structure is an abstract object that organizes data in a hierarchical manner. A hierarchical structure has at least one node and a plurality of fields. A hierarchical structure can have two or more levels. At the topmost level, the hierarchical structure includes one or more nodes. Each of these nodes can aggregate one or more further nodes and/or one or more fields. The one or more further nodes can in turn aggregate additional nodes and/or fields. Thus, the plurality of fields can be organized on different levels of the hierarchical structure. A hierarchical structure can be illustrated as a tree, where the nodes can be illustrated as branches of the tree and the fields can be illustrated as leaves of the tree.

A hierarchical structure can be a database object. For example, a database object that organizes the world-wide sales data of a company can be a hierarchical structure. In this example, a first level might include a plurality of nodes. Each node can be seen as a semantic bracket for related fields or nodes (e.g., a field or node "actual revenue" and a field or node "forecast" can be aggregated by a node "sales data"). Then, on a further level, there might be plurality of fields including the actual sales data such as numbers of items sold, price, discounts and so on.

There can be mappings between fields of the different hierarchical structures. In the example of database objects, this can mean that data of a first field (e.g., a target field) is provided by one or more second fields (e.g., source fields). For instance, two corresponding fields in the hierarchical structures titled "sales first half of 2013" and "sales first half of 2013" can be mapped to a target field in the hierarchical structure titled "sales in 2013."

Even though the examples in the present disclosure focus on database objects, the methods and systems of the present disclosure are not limited to computerized visualization of database objects. Rather, the methods and systems of the present disclosure can be applied in each context where representations of hierarchical structures having mappings between their fields are displayed on a computer device.

Subsequently, the methods and systems of the present disclosure will be explained in connection with FIGS. 1 to 13.

FIG. 1 illustrates the relationship between three example hierarchical structures. A first hierarchical structure 102 ("structure 1") and a second hierarchical structure 103 ("structure 2") are combined into a unified hierarchical structure 101 ("union 1"). This means that the fields of both source structures 102 and 103 have been mapped to corresponding fields in the target structure 101. This process can be carried out, e.g., by an experienced user of a database system. The target structure 101 can be used by the database system to visualize the combined data of the source structures 102 and 103 to a user of the database system. For instance, the source structure 102 can be a first view of the database system and the source structure 103 can be a second view of the database system (e.g., for illustrating revenue data in the first quarter of 2013 and the second quarter of 2013). Then, the target structure 101 can be a database view combining the source database views 102 and 103 (e.g., for illustrating revenue data in the first half of 2013).

After a mapping process between the source hierarchical structures and a target hierarchical structure has been completed, or during the mapping process, a user might want to check mappings between the fields of the hierarchical structures. In order to facilitate this process, a mapping application (e.g., a part of a database application) can provide a graphical representation of the source hierarchical structures and the target hierarchical structure and illustrate mappings between fields of the hierarchical structures. An example representation of the hierarchical structures that can be used for checking mappings between fields of the hierarchical structures will subsequently be discussed in connection with FIG. 2.

Figure 2:
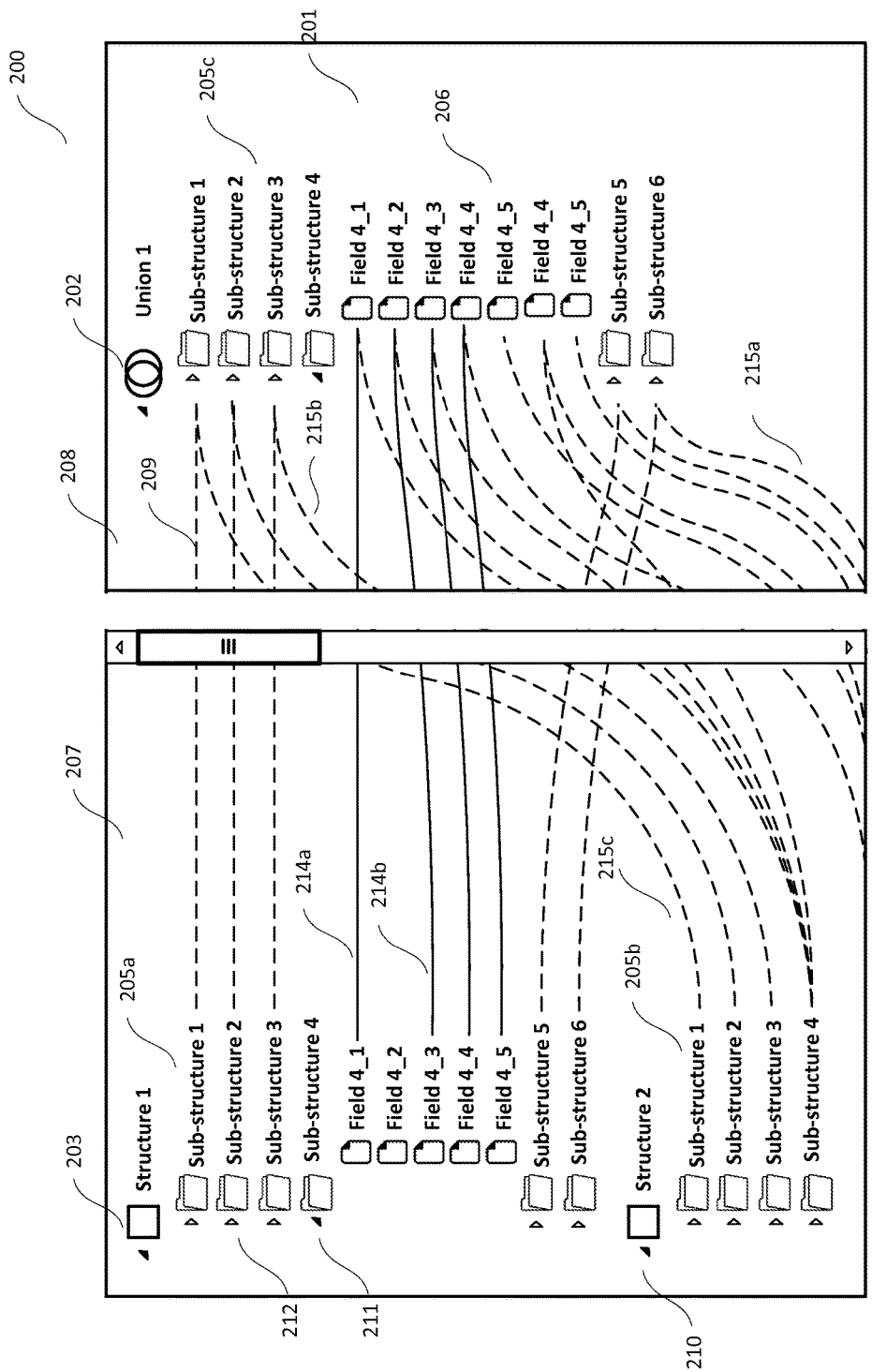
FIG. 2 illustrates a screenshot of a monitoring application displaying different hierarchical structures and connections between fields of the different hierarchical structures according to an implementation.

FIG. 2 illustrates a screenshot 201 of a monitoring application displaying different hierarchical structures and connections between fields of the different hierarchical structures. In FIG. 2, source hierarchical structures 203 and 210 are displayed in the left hand side window 207 of the display area and a target hierarchical structure 202 is displayed in a right hand side window 208. In the example of FIG. 2, only a portion of the first source hierarchical structure 203 is visible. Besides one sub-structure, all sub-structures 212 (nodes) on the second level of the first source hierarchical structure 203 are collapsed (such that the underlying levels of nodes and fields are hidden). One of the substructures 211 of the first source hierarchical structure 203 is expanded and the underlying level of the first source hierarchical structure 203 including a plurality of fields ("Field 4_1" to "Field 4_5") is visible.

The second source structure 210 is only partly visible due to restrictions of the screen space of the display of the user device. The sub-structures 205b (i.e., nodes on the second hierarchical level) are collapsed and their underlying structures are not visible. The display application can provide for manual user commands to expand and collapse a particular structure or sub-structure. In the example of FIG. 2, a user can expand and collapse a particular structure or sub-structure by clicking on the arrow-styled icons left of the icon representing the structure or sub-structure. In other examples, the user can expand and collapse a particular structure or sub-structure by another suitable user command (e.g., a predetermined keyboard shortcut, a gesture or a voice command).

The target structure 202 on the right hand side also includes a plurality of sub-structures 205c and a plurality of fields 206.

In the example of FIG. 2, there are multiple further hierarchical source structures that are mapped onto the target structure 202. A user can bring these additional source structures into the visible area by scrolling down on the left hand side (e.g., by using scroll bar 209). Thus, the source structures are arranged in a vertical fashion below each other in the example of FIG. 2. This arrangement will be used in all examples of the present disclosure. However, the methods and systems of the present disclosure are not limited to this particular representation. Representations of the different hierarchical structures can be displayed in any suitable manner. For instance, the source and the target structures can be displayed in a vertically stacked arrangement. In other examples, the source structures are arranged around the target structure.

In the example screenshot of FIG. 2, mappings between fields of the source and target structures 203, 210, and 202 are also illustrated. If a mapping between two fields exists, a line is displayed connecting the icons representing the respective fields. Depending on the expansion state of the source and target structures, fields mapped to other fields can be hidden if a respective node of the hierarchical structure is collapsed. For instance, at least one field of "sub-structure 1" of "structure 1" is mapped to a field of "sub-structure 1" of the target structure "union 1." However, both "sub-structure 1" nodes are collapsed in FIG. 2 so the corresponding fields are not visible. This difference between mappings between fields which are currently expanded and mappings between fields which are currently not expanded is illustrated in FIG. 2 by two different line styles of the connecting lines (solid lines for expanded fields and broken lines for collapsed fields). For instance, "field 4_1" of source structure 203 and "field 4_1" of target structure 202 are mapped and both in an expanded state. Therefore, their mapping is illustrated by a solid line 214a. On the other hand, at least one field of "sub-structure 4" of source structure 210 is also mapped to "field 4_1" of target structure 202. However, as this field of "sub-structure 4" of source structure 210 is in a collapsed state, the mapping is illustrated by a broken line 215c.

Even though a mapping between a source field and a target field is illustrated by a line in the examples of the present disclosure, the methods and systems of the present disclosure are not limited to this form of illustration. A connection between a source field and a target fields can be illustrated in other ways than through a line. In other examples, the mapping can be illustrated by highlighting only the respective mapped source and target fields.

For checking if the fields of the source and target structures are properly mapped, a user might need to look at the hierarchical level of fields to see the actual connection between a source field and a target field. In order to achieve this goal, in the example of FIG. 2, the user has to scroll to the corresponding portion of the representation of the source and the target structures and expand the source and target structures such that the respective fields become visible.

Figure 3:
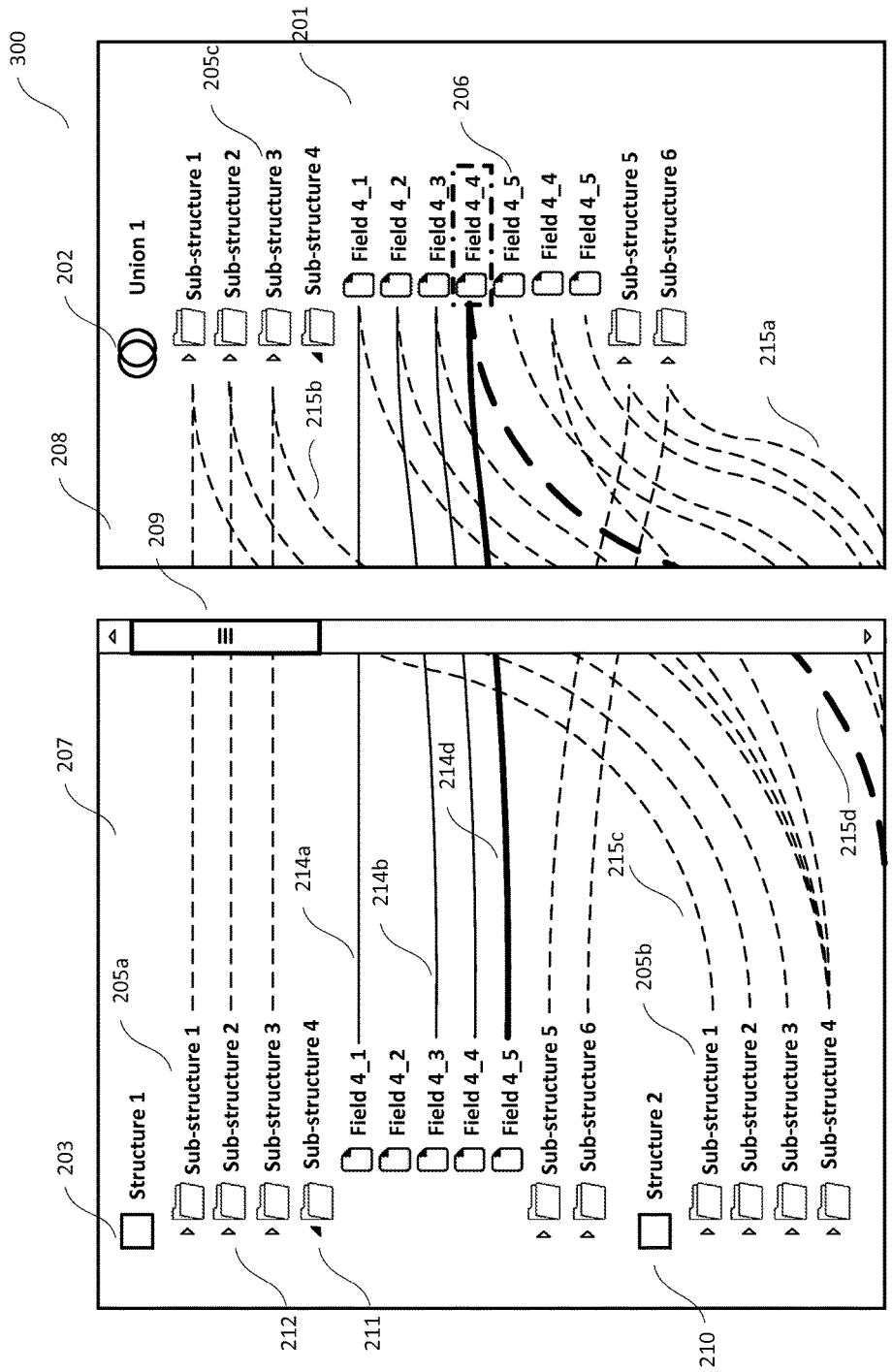
FIG. 3 illustrates another screenshot of the monitoring application of FIG. 2 after a particular field of the right-hand side structure has been selected by a user according to an implementation.

In FIG. 3, a user has selected a particular field 4_5 of the plurality of fields 206 of the right-hand side structure in the monitoring application. As a result, the monitoring application highlights the connecting line 215d illustrating mappings of source structure fields to the particular selected field 4_5 of the plurality of fields 206. To check if the source fields are correctly mapped, the user has to scroll through the representation of the source structures on the left hand side and expand the source structures manually until the source structure fields become visible. In a case where there are several hundreds of source structures each having hundreds or even thousands of mapped fields organized on several hierarchical levels, this can be a fairly tedious task. In addition, as can be already seen in the fairly simple example of FIG. 2 and FIG. 3, the representation of the structures and their mappings can have a considerable complexity. If, e.g., a particular target field has hundreds of corresponding source fields mapped onto the target field, hundreds of lines originate from this field. Typically, all of these lines are rendered by the user device displaying the representation of the hierarchical structures after a user expands a node or scrolls through the representation. This can cause a considerable delay.

Figure 4:
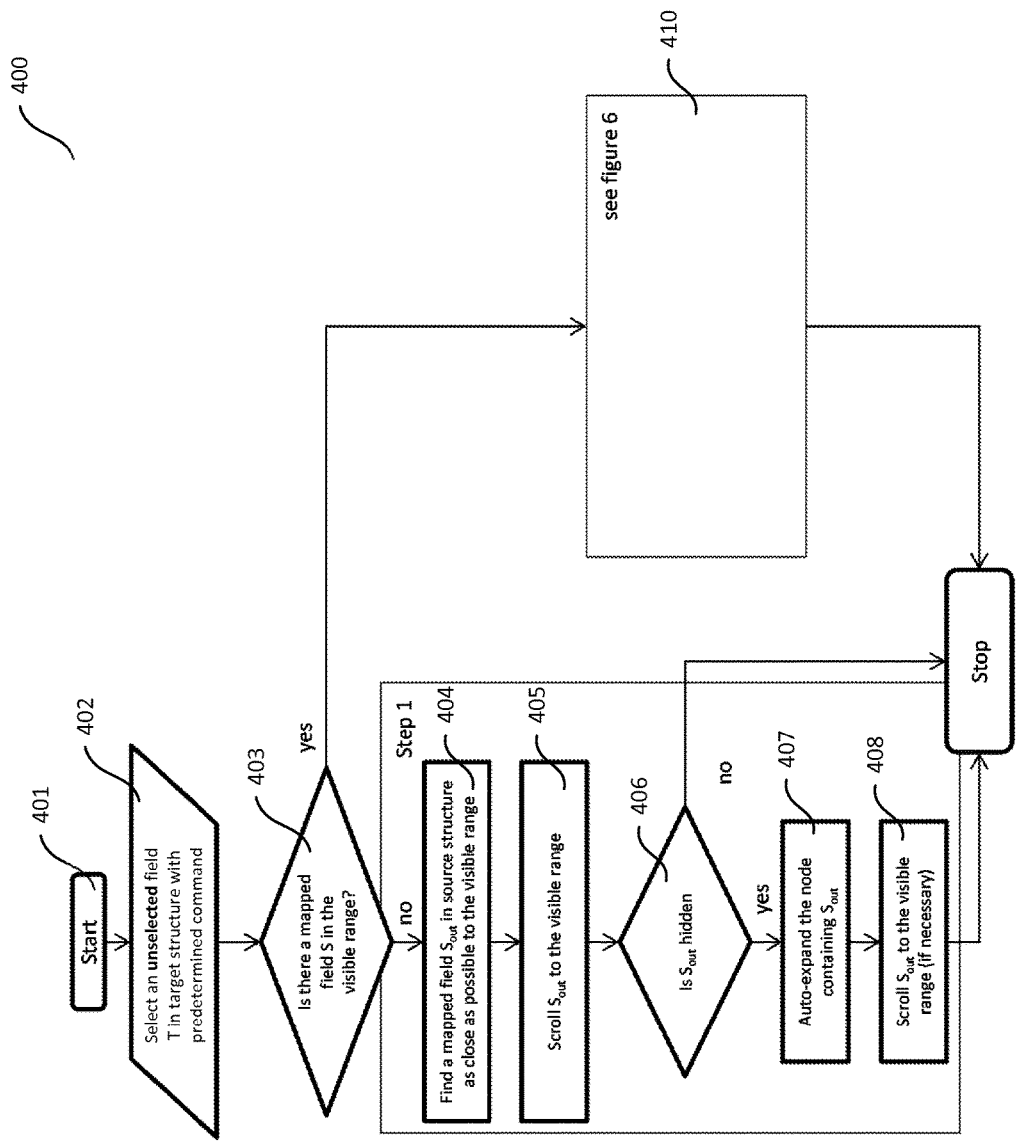
FIG. 4 illustrates a flow chart of an example method to navigate through hierarchical structures of the present disclosure according to an implementation.
Figure 5:
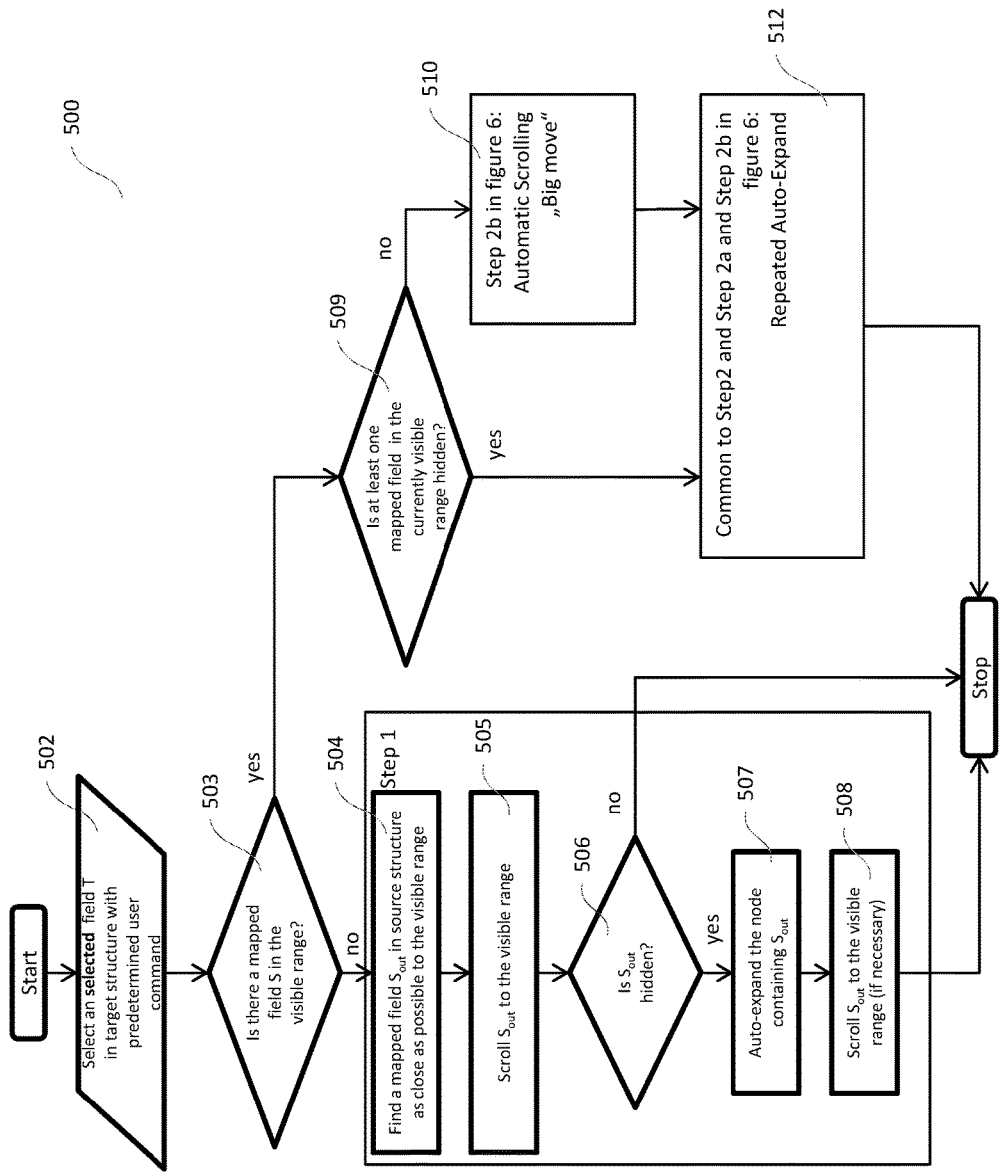
FIG. 5 illustrates another flow chart of an example method to navigate through hierarchical structures of the present disclosure according to an implementation.
Figure 6:
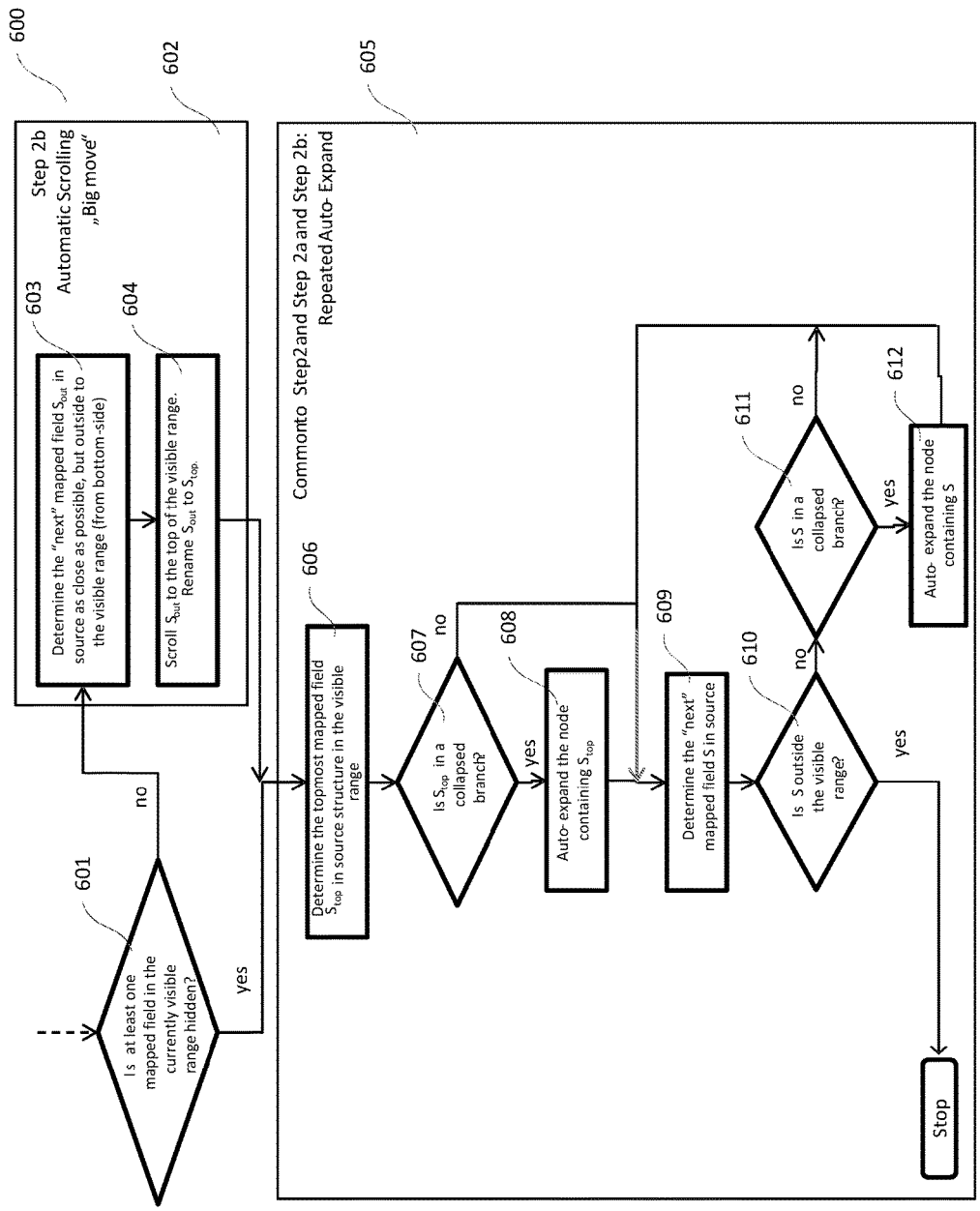
FIG. 6 illustrates another flow chart of an example method to navigate through hierarchical structures of the present disclosure according to an implementation.

In order to address these and other issues, the methods and systems of the present disclosure provide for a lightweight and semiautomatic technique to check the mappings of hierarchical structures. This technique will be subsequently discussed in connection with FIGS. 4 to 13. FIGS. 4 to 6 illustrate a flow chart of an example navigation technique through representations of mapped hierarchical structures of the present disclosure. FIGS. 7 to 13 illustrate screenshots of the graphical user interface corresponding to particular steps of the navigation method.

In one example, the process starts at 402 with the user selecting a particular field of the target structure whose mappings he or she wants to check. This selection can involve a predetermined user command (e.g., clicking on the target field and at the same time hitting one or more key of a keyboard or a particular gesture on a touch screen).

In the example of FIGS. 7 to 13, there are five source hierarchical structures ("structure 1" to "structure 5") which are mapped onto a single target hierarchical structure ("union 1"). Each of the source and target hierarchical structure has only one node and twenty-five fields ("field 1" to "field 25"). Naturally, these numbers are merely illustrative. A number of nodes, fields and source and target structures can be arbitrary for the methods and systems described herein.

Figure 7:
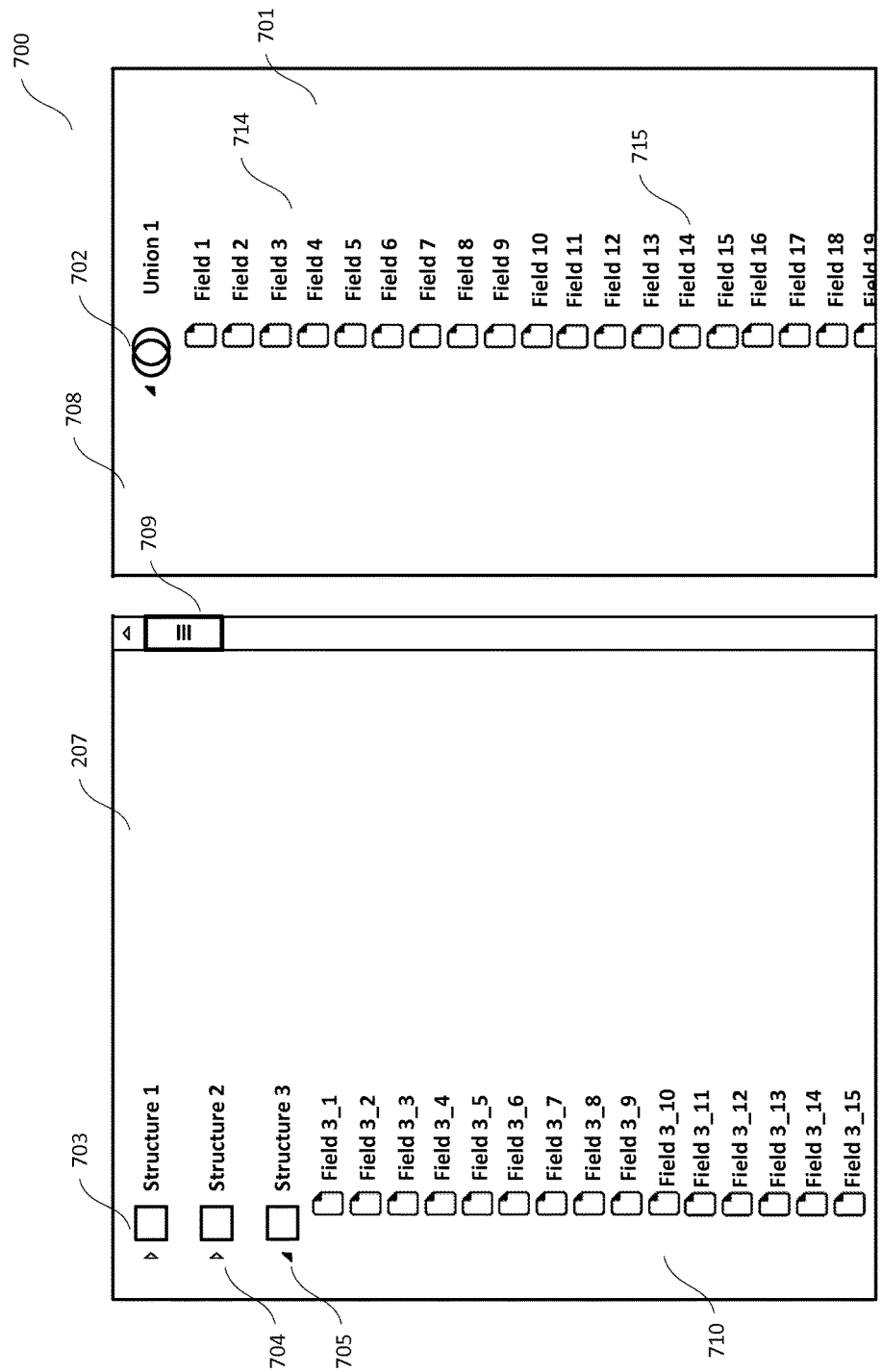
FIG. 7 illustrates another screenshot of a monitoring application displaying different hierarchical structures and connections between fields of the different hierarchical structures according to an implementation.

FIG. 7 shows a first screen-shot of a monitoring application. As can be seen, two of the source structures 704 and 705 whose representations are displayed are in collapsed state. A third source structure 710 is expanded such that a part of its fields are visible. The target structure 702 is also expanded. For clearness sake, only a portion of the connections between source and target fields are shown in FIG. 7. For instance, collapsed source structure 703 ("structure 1") might include fields mapped onto each field of the target structure 702. The same might be true for collapsed source structure 704 ("structure 2"). However, these connections are not depicted in FIG. 7, even though these connections can also be displayed in the monitoring application. In the same manner, only a portion of the existing connections of between the source structure 710 and the target structure 702 or other sources structures not visible in FIG. 7 are shown. For example, all connections between visible field of the source structure 710 and the target structure 702 are depicted. In addition, for one example field 715 ("field 14") of the target structure 702, all existing connections are actually shown in FIG. 7. As can be seen, the connections to other expanded fields (e.g., "field 3_3") are illustrated in solid lines, whereas the connections to fields in collapsed structures (e.g., to "structure 1") are illustrated in broken lines. The difference between connections between expanded and hidden fields can also be illustrated in other ways in which one case has a first representation whereas the second case has a second, different representation (e.g., color or thickness of the line).

Even the simplified representation of the simple example of FIG. 7 illustrates that representations of mappings between hierarchical objects can be fairly complex.

Figure 8:
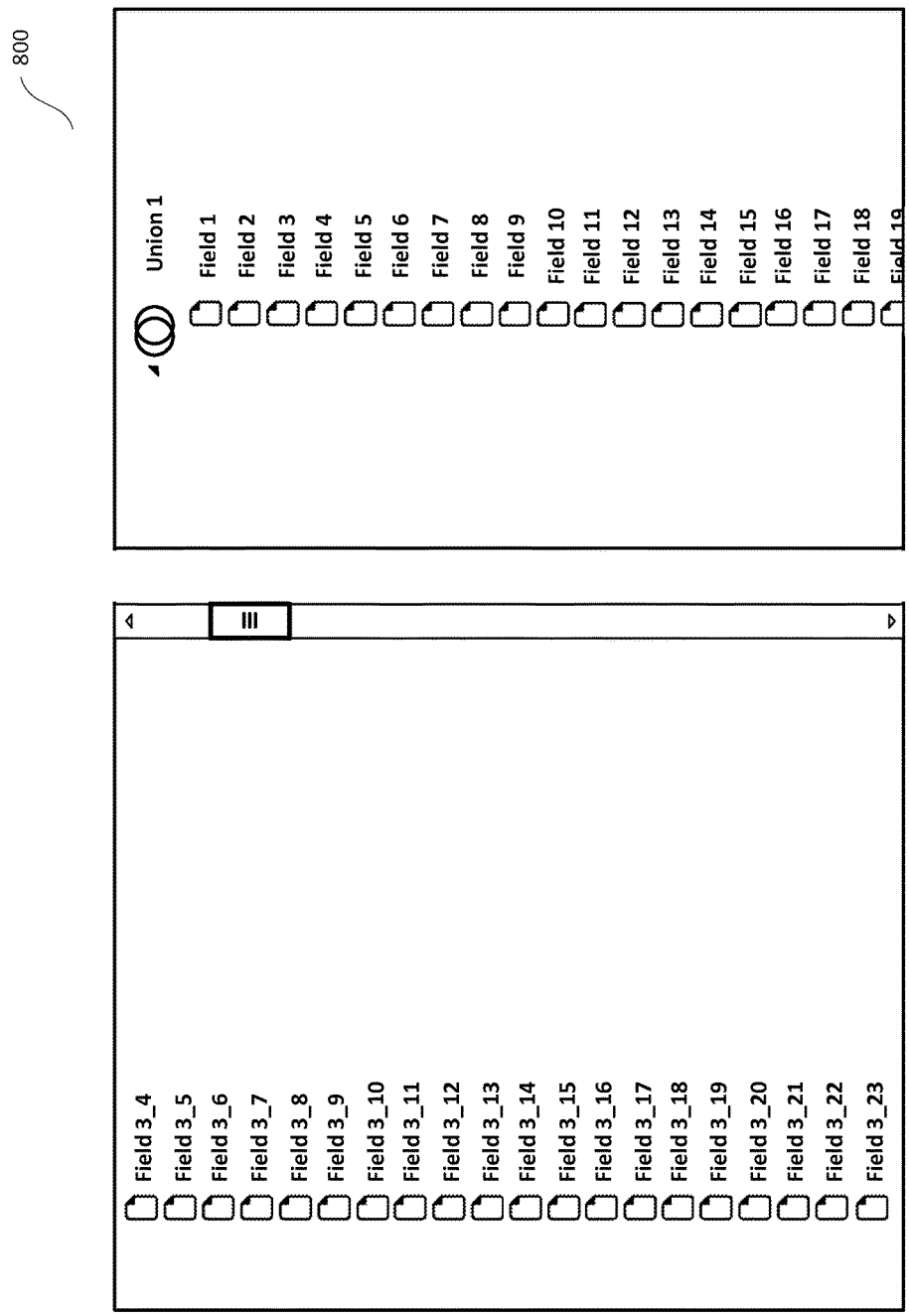
FIGS. 8 to 13 illustrate screenshots of an example method to navigate through hierarchical structures of the present disclosure according to an implementation.

The following schematic screenshots of the example in FIGS. 8 to 13 omit connections between non-selected fields for the sake of clarity. For example, starting from the situation in FIG. 7, a user can have scrolled down a little the representation of the source hierarchical structures. This might result in a screen as depicted in FIG. 8. Starting from this screen, the user can select a particular field of the target structure to start a checking process of the mapping (i.e., operation 402 in FIG. 4).

In a subsequent operation 403, the navigation application checks if the displayed portions of the representation of the hierarchical source structures includes at least one field mapped to the selected field of the target hierarchical structure. In this case, the navigation application proceeds to operation 410. The field mapped to the selected field of the target hierarchical structure can be either visible (i.e., in an expanded state) or hidden (i.e., in a collapsed state). The displayed portions of the hierarchical source structures can include more than one field mapped to the selected field of the target hierarchical structure. If this is the case, the navigation application proceeds to operation 606 of FIG. 6.

At 606, the navigation application determines a topmost mapped source field in the displayed area. At 607, the navigation application checks if this topmost mapped source field is in an expanded or in a collapsed state. If the topmost mapped source field is in a collapsed state, the navigation application can automatically expand the respective source structure until the mapped source field is in an expanded state (at operation 608). In some examples, the navigation application does not expand the respective source structure automatically. However, an automatic expansion process can increase the speed with which a user can navigate through the representation of the hierarchical structures and can avoid additional rendering operations.

After a topmost mapped source field has been expanded, or if the topmost field is already in an expanded state, the navigation application determines a next mapped source field. In the preceding example, the topmost mapped source field is dealt with first. However, in other examples, a different mapped source field can be dealt with first.

When a next mapped source field has been determined, the navigation application determines at operation 610 if this next mapped source field is in the displayed area. If this not the case, the sequence of operations triggered by the users selecting the target field comes to an end. If, on the other hand, the next mapped source field is in a displayed area, the navigation application checks if the next mapped source field is in a collapsed or expanded state in a subsequent operation 611. A next mapped source field in a collapsed state can be brought into an expanded state by the navigation application in operation 612. The navigation application can anticipate a position of the next mapped field after expansion when determining if the next mapped source field is in the displayed area (operation 610). In this manner, the navigation application can conclude that a next mapped source field is not in a displayed area even if a collapsed node hiding the next mapped source field is in the displayed area by anticipating an increased extension of the particular source structure after being expanded.

The navigation application can repeat operations 609 to 612 as long as there are further mapped source fields in the displayed area. If there are no further mapped source fields to display, the sequence of operation triggered by the user selecting the target field comes to an end.

In the sections above sections the operations of the navigation application have been discussed if at least one mapped source field of the user selected target field is in the visible range ("yes" branch of operation 403 of FIG. 4). In the following sections, it will be explained what operations the navigation application can perform if no mapped source field is in the visible range.

At 404, the navigation application can find a mapped source field in the source structure being as close as possible to the displayed portion. In some examples, the navigation application searches in a downward or an upward direction. In some examples the navigation application can also search for a mapped source field not being the closest mapped source field to a currently displayed portion of the hierarchical structures (but merely any arbitrary mapped source field). However, selecting a mapped source field close to a currently displayed portion of the representations of the hierarchical structures can make it easier for the user to quickly check if the respective source field is mapped correctly. He or she might have analyzed the currently displayed portion and a "small jump" might not change the current context completely. On the other hand, a "large jump" might bring a completely different part of the hierarchical structures into the display area, which might requires a longer "acclimatization process" with the context of the mapped source field.

In a subsequent operation 405, the closest (or any other) mapped source field is scrolled in the displayed area. After this operation, the navigation application checks if the mapped source node is in an expanded state or if it is in a collapsed state (at operation 406). In the former case, the sequence of steps triggered by the user selecting the target field comes to an end. In the latter case, at 407, the navigation application expands the source structure including the mapped source field until the mapped source field is in an expanded state. The order of steps can also be reversed. If necessary, the navigation application can then scroll the mapped source field into the visible area (operation 408). In some implementations, this operation concludes the sequence of steps triggered by the user selecting the target field.

Figure 11:
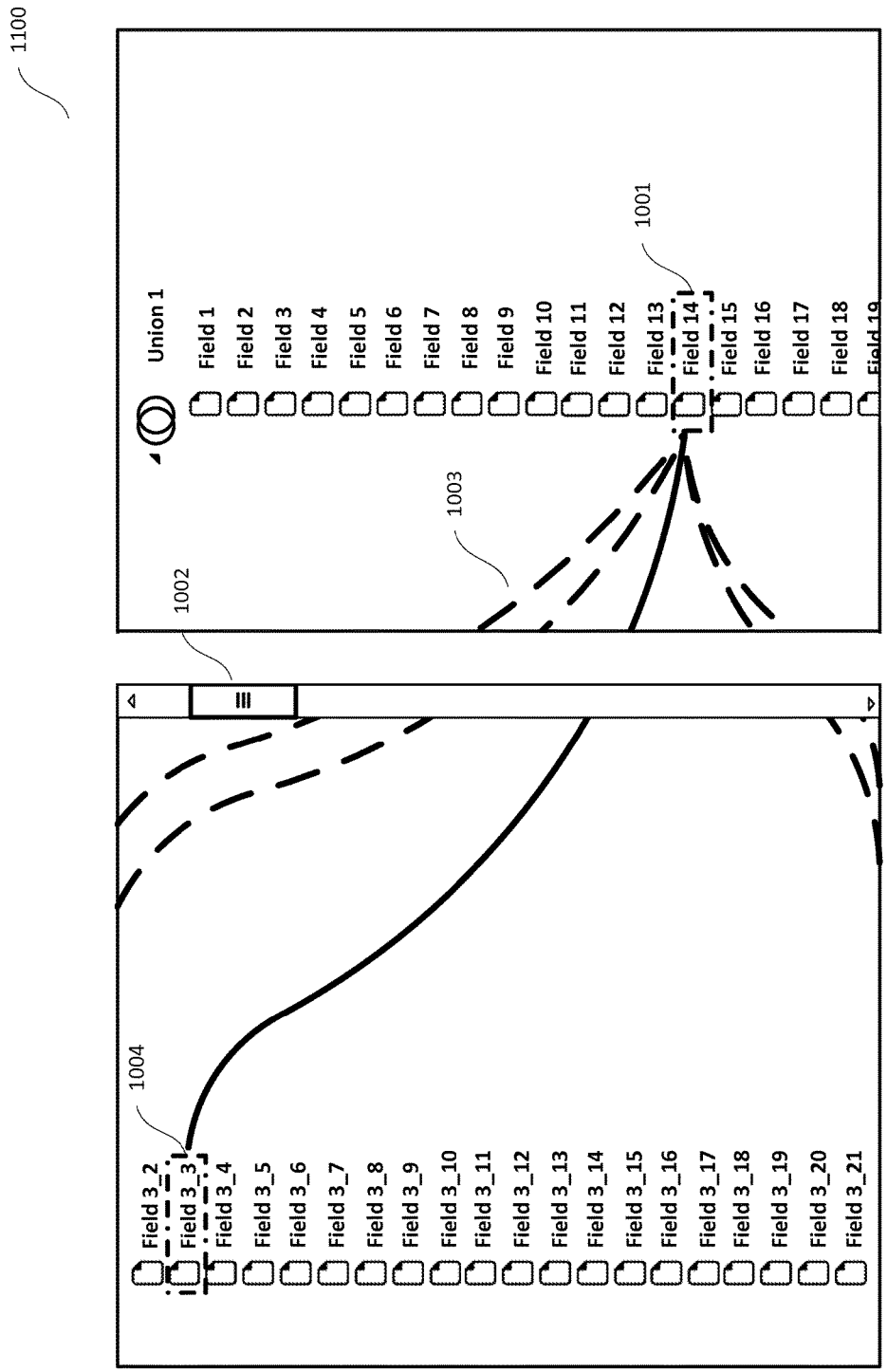

An example of the method described in the preceding sections is illustrated in FIG. 8 and FIG. 11. FIG. 8 shows a current state of a monitoring window before the user has selected a target field. For the sake of clarity, all connections between mapped fields are omitted. In the situation depicted in FIG. 8, the user is about to select target field 14. There are no previously selected target fields in the displayed area. By executing a predetermined command (e.g., a command with a pointer device, a keyboard command, a gesture, a voice command, or a combination of two or more of these commands) the user selects target field 14. Field 3_3 of structure 1 is mapped to the selected target field 14. The source structure 1 is in an expanded state (i.e., the fields of source structure 1 are currently visible). In the situation of FIG. 8, no source structure field mapped to the selected target structure field is in the displayed area. The navigation application performs operations as described in connection with FIGS. 4 to 6. A resulting display area of this operation is depicted in connection with FIG. 11.

As can be seen in FIG. 11, the navigation application has (slightly) changed the display area of the source structures. Source field 3_3 1004, which is mapped onto selected target field 14 1001, has been brought into the displayed area. The navigation application has also brought a predetermined number of neighboring fields into the displayed area. In the example of FIG. 11 this predetermined number is one, but any other number can be selected as well. Displaying a predetermined number of neighboring fields might simplify checking (and possibly correcting) a correct mapping since the user directly sees the context of the mapped source field.

The navigation application of FIG. 11 has "scrolled" the display area slightly "upward," as the source field 3_3 1004 is the mapped source field having a minimum distance from the displayed area at the moment the user selects the target field (see FIG. 8). In other examples, a navigation application might determine which mapped source field has a minimum distance to the displayed area in an upward or downward direction. In some examples, as discussed below, the user might skip through the mapped source field by repeatedly interacting with (e.g., selecting) a target field. In some of these examples, the navigation application can always "scroll" the target structure in a particular direction (e.g., upwards or downwards). In still other examples, the hierarchical source structures are arranged horizontally. In some of these examples, the navigation application can determine a minimum distance source field at the left or the right of a currently displayed area of the sources structures.

Coming back to FIG. 11, the navigation application has highlighted several elements to allow the user to understand the mapping situation in the displayed area quickly. For example, the selected target field 1001 and the source field 1004 mapped to the selected target field 1001 are highlighted. In the example of FIG. 11, the highlights consist in boxes around the icons and names of the respective fields. In other examples, other highlights can be used.

Additionally or alternatively, connections from the selected target field 1001 to source fields are highlighted. As can be seen in FIG. 11, the selected target field 1001 has five connections, i.e., five source fields are mapped onto the selected target field 1001. It should be kept in mind that the navigation application can also display all other existing connections of source fields and target fields in the displayed area (and even connections between not visible fields running through the displayed area). In an example in which all (or a plurality) of connections are constantly illustrated, the connections of a selected target field can be highlighted. This can include a particular color, line style, line thickness or a combination of one or more of these highlights.

In the examples of FIG. 11, one of the connections extends between an expanded source field 1004 and the selected target field 1001. The remaining connections extend between collapsed source fields (not visible in the displayed area of FIG. 11) and the selected target field 1001. The navigation application can illustrate connections between fields in an expanded state and connections including at least one field in a collapsed state differently. In the example of FIG. 11, connections between fields in an expanded state are illustrated by solid lines, connections including at least one field in a collapsed state are illustrated by broken lines. In other examples, the illustrations can differ in color, size or line style.

Additionally or alternatively, connections in which at least one field is not in the currently displayed area can be illustrated differently from connections whose fields are both visible.

In the example situation of FIG. 11, the minimum distance mapped source field already is in an expanded state. The navigation application merely brought the mapped source field into the displayed area. In another example situation, a minimum distance mapped source field can be in a collapsed state. In this situation, the navigation application can automatically expand the respective source structure until the mapped source field is in an expanded state (e.g., by performing the expansion operations as shown in FIG. 6). This navigation application can automatically carry out all necessary scrolling and expansion operations to bring a mapped source field into the displayed area in an expanded state upon a single user interaction with a target field (e.g., a predetermined user command). In this manner, a number of user interactions can be minimized. In addition, the user can use the command regardless of a current expansion and scrolling state of the displayed representations of the source and target structures. In other examples, the above described process can involve more than one user interaction with the target field (e.g., a first "scrolling command" and a second "expansion command").

Figure 9:
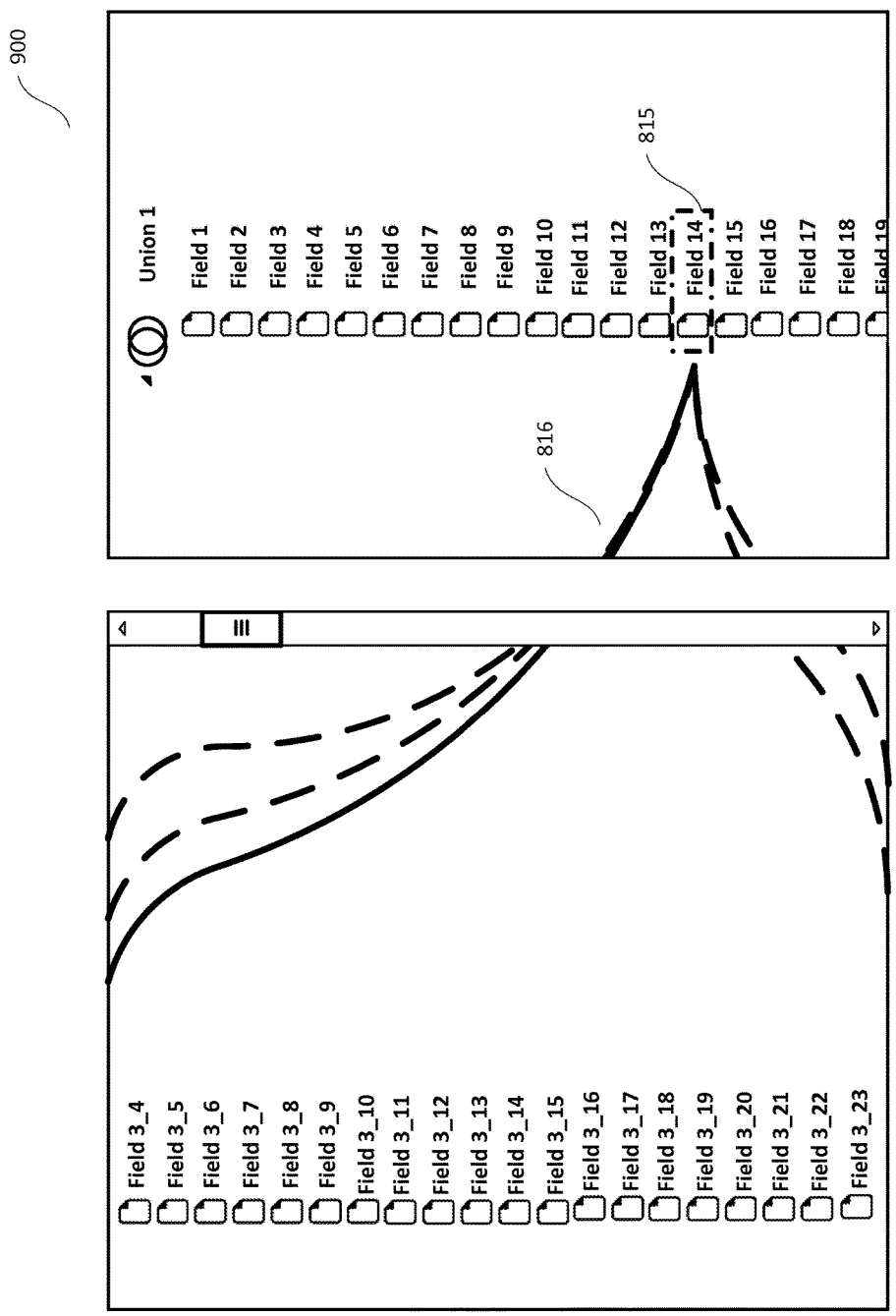

In example situation of FIG. 9, no mapped source field was in the visible area. In still another example situation, a mapped source field can be in the displayed area. If the mapped source field is already in an expanded state, the navigation application can merely highlight the mapped source field, the target field and the connections when a user selects the target field. However, if the mapped source field is in a collapsed state, the navigation application can automatically expand the source structure until the mapped source field is in an expanded state (this can include the operations shown in FIG. 6). Again, the user can trigger these actions with a single user interaction (e.g., a predetermined command). In addition, the user interactions (e.g., the predetermined command) can be the same regardless of if a mapped source field is already in the displayed area or not.

In the previous sections examples of an automated combined "scroll (if necessary)" and "expand (if necessary)" operation have been described. As discussed, a single user interaction with a target field can trigger these operations. Moreover, the navigation application can provide the user with one or more additional commands that lead to a different behavior.

One additional command will be described in connection with FIG. 9. As shown in FIG. 9, the user has selected a target field 815 by using a different command from the command triggering the operations described above. Upon this command, the navigation application merely highlights the connections 816 between the selected target field 815 and source fields mapped to the selected target field 815. No scrolling or expansion operations are performed, even though no mapped source field is in the displayed area. In an alternative example, the navigation application can scroll to a mapped source field (e.g., by using techniques described above) but not perform any expansion operation.

Figure 10:
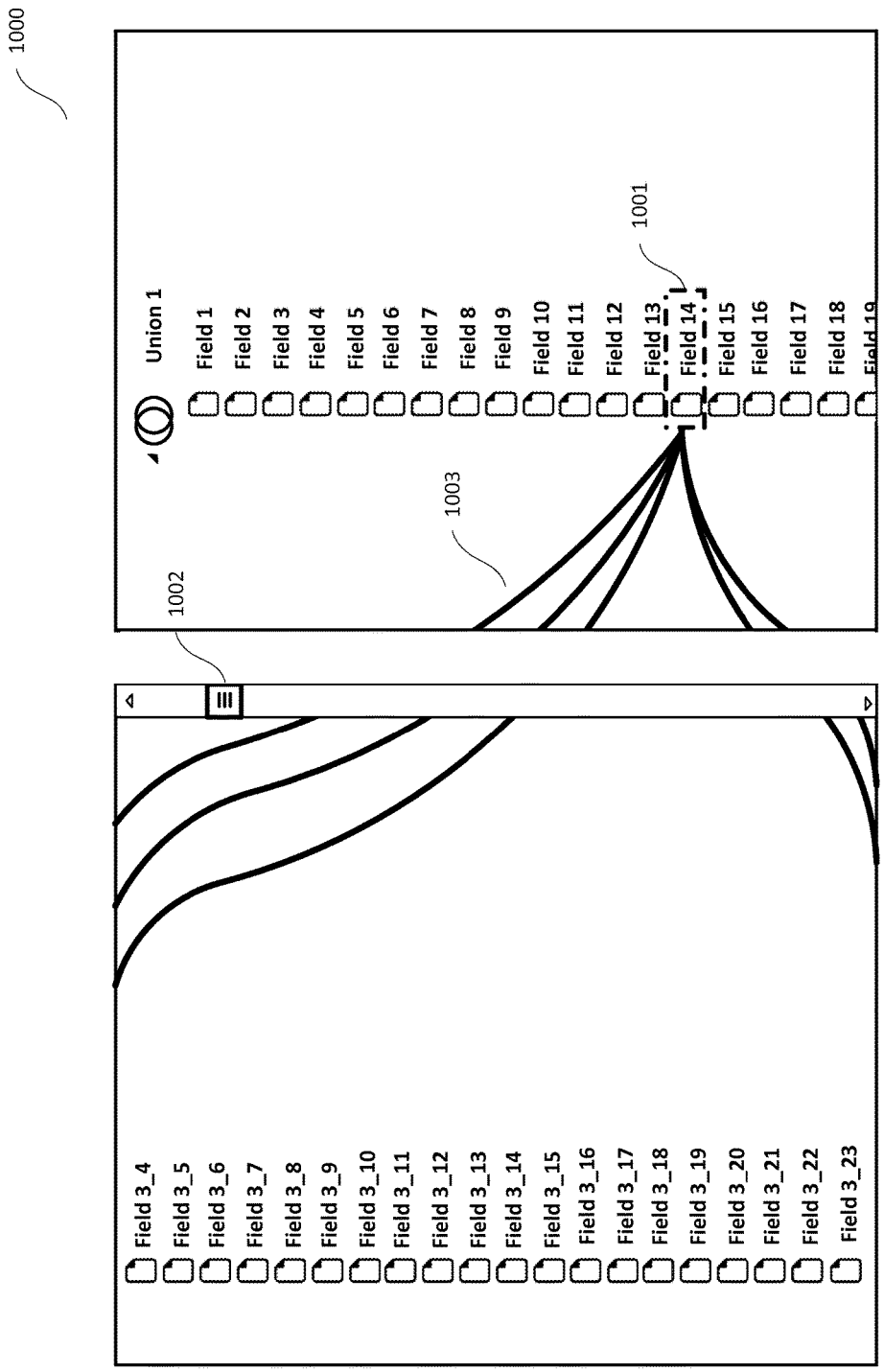

A second additional command will be described in connection with FIG. 10. As shown in FIG. 10, the user has selected a target field 1001 by using a different command from the commands triggering the operations described above. Upon this command, the navigation application highlights the connections 1003 between the selected target field 1001 and the navigation application expands all nodes of the source structures. No scrolling operations are performed, even though no mapped source field is in the displayed area. As can be seen when comparing the scroll bars 102 in FIG. 10 and, e.g., FIG. 8, this technique can result in an expanded source structure covering a substantial amount of (virtual) screen space. It might take a considerable amount of time to completely scroll through the source structures. Nevertheless, it might be advantageous to give the user an option for expanding the complete source structure.

In the preceding sections, different operations of a navigation application have been described that can be carried out (at least partly) automatically when a user initially selects a particular target field. In some examples, the user can interact with an already selected target field (e.g., by the same command that can be used for selecting the target field). In the following sections, operations of the navigation application in this situation will be discussed.

An example operation in this this situation is depicted in connection with FIG. 5. As discussed, the process starts at 502 with the user interacting with an already selected target field. At operation 503, the navigation application determines if there is a mapped source field in the currently displayed area. If this is not the case, the navigation application carries out operations 504 to 508 (if necessary). These operations are identical to the operations described in connection with FIG. 4 for the "initial selection" case. The navigation application can determine a mapped source field with a minimum distance and bring it into the displayed area.

If there is at least one mapped source field in the currently displayed which is in a collapsed state, the navigation application can determine at 509 (corresponds to 601 in FIG.

6) if the at least one mapped source field is hidden (i.e., in a collapsed state). If this is the case, the navigation application can perform operation 512 (corresponding to operations 606 to 612 detailed in operation 605 of FIG. 6) to expand the one or more hidden mapped source fields.

If there is no mapped source field in the currently displayed area which is in a collapsed state, the navigation application proceeds to operation 510. This operation corresponds to operation 602 in FIG. 6. In a first operation 603, the navigation application determines a "next" mapped source field that is not currently in the displayed area. In the example of FIG. 6, the navigation application searches a next mapped source field in a downward direction of the displayed area of the source structures. As discussed above, the representation of the source structure can also be arranged in other manners than in a vertically stacked manner (e.g., horizontally stacked or surrounding the target structure). In these examples, a "next" mapped source field can be located in other directions. The techniques described in the present disclosure are equally applicable in these situations. In still another example, the navigation application can select any source field of the set of mapped source fields not currently displayed. However, this might result in a "long jump" in the source structure (as will become evident below) which might make it harder for the user to quickly grasp the context of a mapped source structure.

At 604, the application "scrolls" the determined next mapped source field to the top of the displayed area. Subsequently, the operations 606 to 612 of operation 605 can be performed by the navigation application. If necessary, the next mapped source field is brought into an expanded state. In addition, if necessary, further mapped source fields in the displayed area are brought into an expanded state. Thus, the operations 602 result in shifting at least one mapped source field in an expanded state out of view and moving at least one different mapped source field into view (and, if necessary, expanding the source structure). In this manner, a user can skip through several (or all) mapped source fields of a particular target field in a sequential fashion by using a single command. Thus, the user might be able to check if a particular target field is correctly mapped in a time and resource efficient manner. An example of this technique will be explained subsequently in connection with FIGS. 11 to 13.

Figure 12:
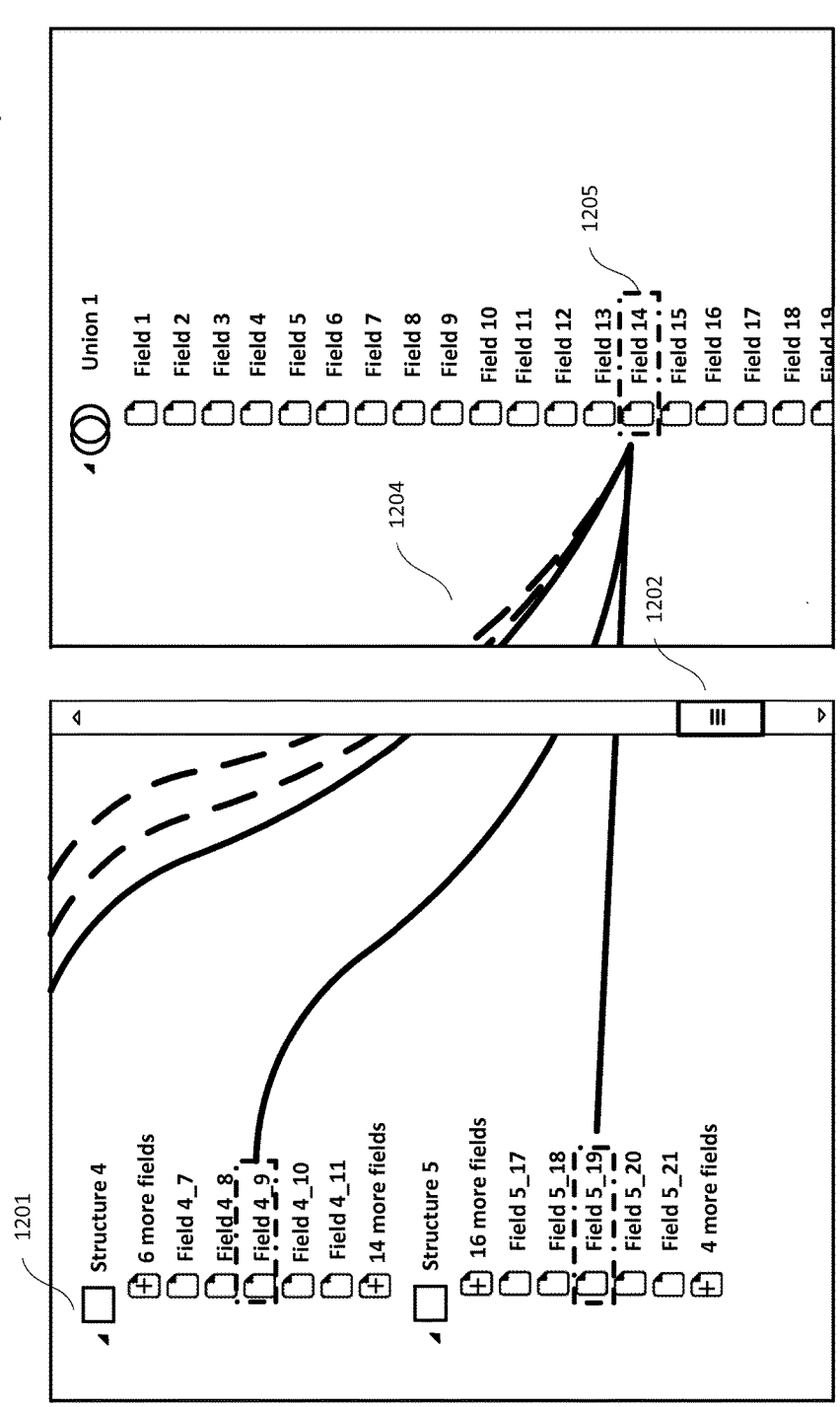

As discussed previously, the status in FIG. 11 might be the result of a user initially selecting target field 1001. The user can check that the target field 1001 is correctly mapped to field 3_3 1004 of source structure 1. Then, the user might re-select target field 1004. The navigation application can determine a next mapped source field which is included in structure 4 in the present example. As shown in FIG. 12, the navigation application has shifted the displayed area of the source structures. Structure 4 1201 and structure 5 have been brought into the displayed area, each including a mapped source field (fields 4_9 and 5_19). As can be seen when having a look at the scroll bar 1202, the navigation application has shifted the displayed area to the "bottom" of the representation of the source structures. In addition, the navigation application has brought the mapped source fields in the displayed area into an expanded state (as indicated by the broken lines in FIG. 11, sources structures 4 and 5 were in a collapsed state previously). As can be seen in FIG. 12, the fields of the source structures 4 and 5 are only partially expanded. This optional technique will be discussed in more detail below.

Figure 13:
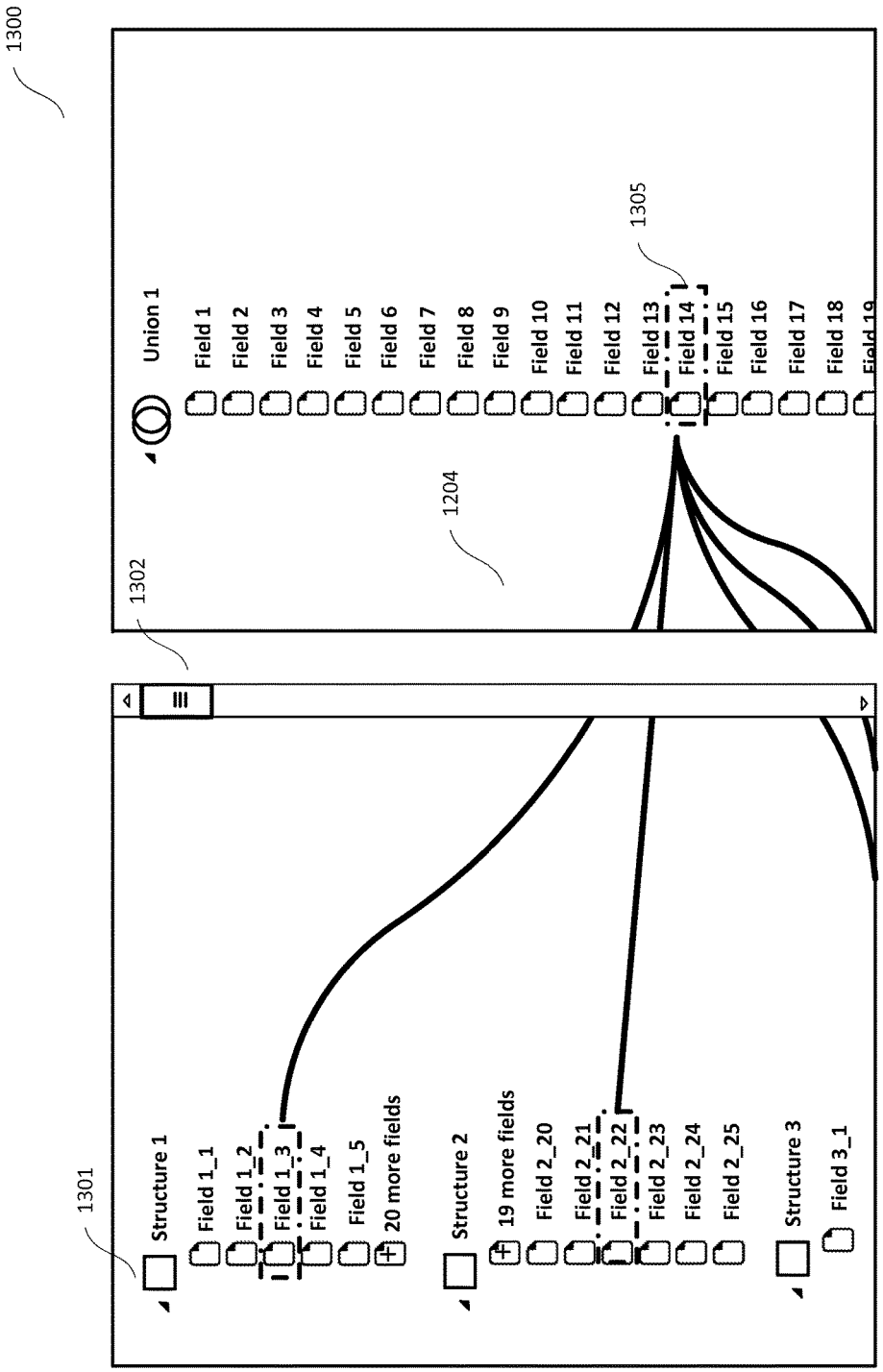

In FIG. 13 the situation after a further re-selection operation of the selected target field 14 1305 is depicted. Again, as in FIG. 12 all mapped source fields have been expanded, the navigation application determines a "next" mapped source field not in the displayed area. This time, as the source structure 5 is the "bottommost" source structure in the vertically stacked representation of source structures of the present example, a "next" mapped source structure can be found in source structure 1 1301 (i.e., the navigation application continues at the top of the representation of source structures). Again, the navigation application has expanded the sources structures 1 and 2 in the displayed area to bring the respective mapped source fields into view. In this manner, a user has quickly skipped through all mapped source fields of the target field 14 1305. The user can do so simply by repeatedly using a single user command. The navigation application automatically performs the required scrolling and expansion steps.

As can be seen in FIG. 13, all mapped source fields are now in an expanded state. In an optional example, the navigation application can collapse source structures after they have been moved out of the displayed area. This can, e.g., further reduce a rendering workload as a number of connections to be rendered might be reduced.

As depicted in FIGS. 12 and 13, the navigation application can expand a node of a source structure only partially. For instance, as can be seen for structure 4 in FIG. 12, a node can be expanded such that the mapped source field and a predetermined number of source fields in its vicinity become visible. The remaining source fields can remain collapsed in a sibling node of the mapped source field. In this manner, a number of expanded fields can be limited. For example, users of database systems might create models with a large number (e.g., hundreds) of child fields of a single node on one hierarchical level. Bringing all fields into view would substantially increase the size of the representation of these hierarchical structures. On the other hand, the user might be predominantly interested in the respective mapped source fields. By collapsing all but a predetermined number of sibling fields of a particular mapped source field into a sibling node, this effect can be avoided.

In the examples of FIGS. 12 and 13, the predetermined number of expanded sibling nodes is four (two above a respective mapped source node and two below a respective mapped source node). However, the number of expanded sibling source nodes can also be different (e.g., one or two or more than four). In one example, only the mapped source node is expanded and all its sibling fields can be collapsed in sibling node. However, displaying a predetermined non-zero number of sibling fields of a mapped source field can be advantageous as the user might see the mapped source field in its context which might make it easier to check if the source field is properly mapped.

In the example of FIGS. 12 and 13, the sibling nodes are illustrated by a particular icon. The navigation application can provide a command (e.g., clicking on the icon) to replace the sibling node by the respective sibling fields. In addition, as can be seen in FIG. 12, the example navigation application provides two sibling nodes (one below and one above the respective mapped source field and the displayed source fields in its vicinity). However, in other examples the navigation application can provide only one sibling node, or more than two sibling nodes.

In all examples above the user selects a target field. In many cases, the mapping of the source structures onto the target structure is injective (i.e., a target field can have more than one source field but every source field has only one target field). However, in other examples a source field can be mapped onto different target structures. In addition or alternatively, there can be more than one target structure. In these situations (and also in other situations where a source field can be mapped onto more than one target field), the techniques described herein can also be used to select and re-select a source field and skip through multiple target fields onto which the respective source field is mapped.

In the previous sections, the methods and systems for efficient navigation through hierarchical mappings on graphical user interfaces have been described in a functional manner. The methods and systems of the present disclosure can be embodied in different hardware and software environments, as will be discussed in the subsequent sections.

At a high level, a computer system providing the methods and systems for efficient navigation through hierarchical mappings on graphical user interfaces is associated with a computer or processor. A computer or processor comprises an electronic computing unit (e.g., a processor) operable to receive, transmit, process, store, or manage data and information associated with an operating environment of the database system. As used in the present disclosure, the term "computer" or "processor" is intended to encompass any suitable processing device. The term "processor" is to be understood as being a single processor that is configured to perform operations as defined by one or more aspects described in this disclosure, or the "processor" comprises two or more processors, that are configured to perform the same operations (e.g., in a manner that the operations are distributed among the two or more processors). The processor may comprise multiple organic field-effect transistors or thin film transistors or a combination thereof. This may allow processing the operations in parallel by the two or more processors. The two or more processors may be arranged within a supercomputer, the supercomputer may comprise multiple cores allowing for parallel processing of the operations. For instance, a computer or processor may be a desktop or a laptop computer, a cellular phone, a smartphone, a personal digital assistant, a tablet computer, an e-book reader or a mobile player of media. Furthermore, the operating environment of the database system can be implemented using any number of servers, as well as computers other than servers, including a server pool. Indeed, the computer or processor and the server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the computer, processor and server may be adapted to execute any operating system, including Linux, UNIX, Windows, Mac OS, iOS, Android or any other suitable operating system.

The term "computing device," "server," or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures. In enterprise systems, there are OLTP (OnLine Transaction processing) systems used to carry out business processes of a company where employees and other stakeholders, such as suppliers or customers, follow a business process which may result in business documents created in a database of the OLTP system. The database system can include in-memory databases in addition to the persistent databases described in connection with FIG. 1 and thereby exploit recent innovations in hardware to run a database in main memory. In an implementation of the present disclosure described herein, the servers may be types of a Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC), a ByDesign platform, SuccessFactors Platform, ERP Suite technology or in-memory database such as High Performance Analytic Appliance (HANA) platform. In an aspect, the servers may be based on two different of the above mentioned platforms.

Regardless of the particular implementation, "software" or "operations" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and R, Perl, any suitable version of 4GL, as well as others.

The figures and accompanying description illustrate example processes and computer-implementable techniques. However, the database system operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the operations in these processes may take place simultaneously, concurrently, and/or in different orders or combinations than shown. Moreover, operating environment may use processes with additional operations, fewer operations, and/or different operations, so long as the methods remain appropriate.

Aspects of the subject-matter and the operations described in this specification can be implemented in digital electronic circuitry, semiconductor circuits, analog circuits, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) or "user interface" can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) "icons," some or all associated with a web browser, such as interactive fields, pull-down lists, and buttons operable by the user of the computing device hosting the UI. These and other UI icons may be related to or represent the functions of the web browser. The term "browser user interface" refers to a graphical user interface embedded in a web browser environment on the remote computing device. The browser user interface may be configured to initiate a request for a uniform resource locator (URL) and may be configured to display a retrieved web page such as an HTML coded web page. The browser user interface may comprise displayed or hidden icons which, upon activation, initiate an associated electronic process inside or outside the remote computing device. For example, the browser user interface may be Internet Explorer, Chrome or Firefox. "Creating an icon" is to be understood as generating a new icon on the user interface. "Modifying an icon" is to be understood as changing a property of an existing icon on the user interface. "Deleting an icon" is to be understood as vanishing an existing icon on the user interface, e.g., for replacement by a newly created icon. "Updating the user interface" thereby is to be understood as creating, modifying, or deleting an icon on the user interface.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer or computer or processor may be a processor for performing actions in accordance with instructions and one or more memory devices for storing instructions and data. Generally, a computer or computer or processor will also include, or be operatively coupled to receive data from or transfer data to, or both, one or more mass storage devices for storing data, e.g., magnetic, magneto optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the user interface described in this specification can be implemented on a computer having a non-flexible or flexible screen, e.g., a CRT (cathode ray tube), LCD (liquid crystal display) or OLED (organic light emitting diode) monitor, for displaying information to the user and a keyboard and a pointer, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or computer or processor can interact with a user by sending documents to and receiving documents from a device that is used by the user; for example, by sending web pages to a web browser on a user's user device in response to requests received from the web browser.

Implementations of the subject-matter described in this specification can be implemented in a computing system that includes a back end component, e.g., as a server, or that includes a middleware component, e.g., an application server, or that includes a front end component, e.g., a user computer having a graphical user interface or a Web browser through which a user can interact with an implementation of the subject-matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementation or on the scope of what may be claimed, but rather as descriptions of features that may be specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
    displaying a first portion of a representation of a first hierarchical structure and a first portion of a representation of a second hierarchical structure in a displayed area of a graphical user interface of a computing device, wherein each of the first hierarchical structure and the second hierarchical structure comprises a plurality of sub-structures that are selectively collapsible to hide a first portion of a plurality of fields and expandable to display a second portion of the plurality of fields, such that only parts of the respective hierarchical structure and sub-structure are expanded at a time to reduce a rendering load of a processor of the computing device, and the second hierarchical structure is a combination of the first hierarchical structure and at least one additional hierarchical structure;
    displaying a representation of mappings between fields of a sub-structure of the first hierarchical structure and a sub-structure of the second hierarchical structure;
    receiving a predetermined user command associated with a particular field of the sub-structure of the second hierarchical structure, wherein the predetermined user command is a selection command of the particular field of the sub-structure of the second hierarchical structure; and
    in response to receiving the predetermined user command:
        determining that the displayed first portion of the representation of the sub-structure of the first hierarchical structure comprises a hidden field mapped to the particular field of the sub-structure of the second hierarchical structure and expanding the first portion of the representation of the sub-structure of the first hierarchical structure until the at least one field mapped becomes visible; and
        determining that the displayed first portion of the representation of the first hierarchical structure comprises sub-structure with no field mapped to the particular field of the sub-structure of second hierarchical structure and displaying, in the displayed area, a second portion of the representation of sub-structure of the first hierarchical structure comprising at least one field mapped to the particular field of the sub-structure of the second hierarchical structure, wherein the second portion of the representation of the sub-structure of the first hierarchical structure is displayed in the displayed area while at least a portion of the displayed first portion of the representation of the sub-structure of the first hierarchical structure is no longer displayed in the displayed area, after displaying the second portion of the first hierarchical structure determining that the at least one field of the first structure mapped to the particular field of the sub-structure of the second hierarchical structure is hidden, wherein the sub-structure of first hierarchical structure includes a plurality of further fields on a hierarchical level of the at least one field mapped to the particular field of the sub-structure of second hierarchical structure; and
        wherein expanding the second portion of the representation of the sub-structure of the first hierarchical structure until the at least one field mapped to the particular field of the sub-structure of the second hierarchical structure becomes visible includes:
            displaying a predetermined number of fields of the plurality of further fields on the hierarchical level of the at least one field mapped in the vicinity of the at least one field mapped to the particular field of the sub-structure of second hierarchical structure; and
            hiding the remaining fields of the plurality of further fields on the hierarchical level of the at least one field mapped in one or more sibling nodes.

2. The computer implemented method of claim 1, the method further comprises displaying a third portion of the representation of the first hierarchical structure including the at least one field mapped wherein if the at least one field mapped to the particular field of the sub-structure of the second hierarchical structure is not in the displayed area after the expanding step of the first portion or the second portion.

3. The computer-implemented method of claim 1, wherein the first hierarchical structure and the second hierarchical structure are database objects of a computerized database system.

4. The computer-implemented method of claim 1, further comprising: receiving a second predetermined user command associated with the particular field of the sub-structure of the second hierarchical structure; and in response to receiving the second predetermined user command: displaying a fourth portion of representation of the first hierarchical structure including at least one second field mapped to the particular field of the sub-structure of the second hierarchical structure; if the at least one second field mapped to the particular field of the sub-structure of the second hierarchical structure is hidden, expanding the fourth portion of the first hierarchical structure until the at least one second field mapped to the particular field of the sub-structure of the second hierarchical structure becomes visible.

5. The computer-implemented method of claim 4, further comprising receiving further predetermined user commands associated with the particular field of the sub-structure of the second hierarchical structure; and in response to receiving the further predetermined user commands displaying further portions of first hierarchical structure including at least one further field mapped to the particular field of the sub-structure of the second hierarchical structure.

6. The computer-implemented method of claim 1, wherein the least one field mapped to the particular field of the sub-structure of the second hierarchical structure is a next field in the representation of the first hierarchical structure to the first portion of a representation of the first hierarchical structure currently displayed.

7. The computer-implemented method of claim 6, wherein the at least one second field mapped to the particular field of the sub-structure of the second hierarchical structure is a next field in a downward direction in the representation of the first hierarchical structure.

8. The computer-implemented method of claim 1, further comprising: receiving a user command associated with one of the one or more sibling nodes; and expanding the one of the one or more sibling nodes to display one or more of the hidden fields on the hierarchical level of the at least one field mapped to the particular field of the sub-structure of the second hierarchical structure.

9. The computer-implemented method of claim 1, wherein the predetermined number of fields displayed is zero or between 1 and 10.

10. The computer implemented method of claim 1, further comprising: receiving a second predetermined user command associated with a particular field of the sub-structure of the second hierarchical structure; in response to receiving the second predetermined user command: expanding all portions of the first hierarchical structure including fields mapped to the particular field of the sub-structure of the second hierarchical structure.

11. The computer implemented method of claim 10, further comprising: receiving a third predetermined user command associated with a particular field of the sub-structure of the second hierarchical structure; in response to receiving the third predetermined user command: highlighting all fields mapped to the particular field of the sub-structure of the second hierarchical structure.

12. The computer implemented method of claim 1, wherein displaying the first portion or the second portion includes indicating connections between fields of the sub-structure of the first hierarchical structure mapped to fields of the sub-structure of the second hierarchical structure.

13. The computer-implemented method of claim 12, wherein connections between the particular field of the sub-structure of the second hierarchical structure and fields of the sub-structure of the first hierarchical structure are highlighted.

14. The computer-implemented method of claim 13, wherein highlighting involves changing a line type, line color, or both of a connection between fields.

15. The computer-implemented method of claim 1, the method further comprising: receiving a predetermined user command associated with the particular field of the sub-structure of the second hierarchical structure; in response to receiving the predetermined user command: displaying a first portion of a representation of a third hierarchical structure, wherein the third hierarchical structure includes a plurality of fields, wherein at least one field of the sub-structure of the third hierarchical structure is mapped onto the particular field of the sub-structure of the second hierarchical structure; displaying a representation of mappings between fields of the sub-structure of the third hierarchical structure and a second hierarchical structure; and if the at least one field of the substructure of the third hierarchical structure mapped to the particular field of the sub-structure of the second hierarchical structure is hidden, expand the first portion of the representation of the third hierarchical structure until the at least one field mapped is visible.

16. The computer-implemented method of claim 15, further comprising: displaying the second portion of the representation of the first hierarchical structure and the first portion of the representation of the third hierarchical structure simultaneously.

17. A non-transitory, computer readable medium storing instructions thereon which, when executed by a processor, cause the processor to perform operations comprising: displaying a first portion of a representation of a first hierarchical structure and a first portion of a representation of a second hierarchical structure in a displayed area of a graphical user interface of a computing device, wherein each of the first hierarchical structure and the second hierarchical structure comprises a plurality of sub-structures that are selectively collapsible to hide a first portion of a plurality of fields and expandable to display a second portion of the plurality of fields, such that only parts of the respective hierarchical structure and sub-structure are expanded at a time to reduce a rendering load of a processor of the computing device, and the second hierarchical structure is a combination of the first hierarchical structure and at least one additional hierarchical structure;

displaying a representation of mappings between fields of a sub-structure of the first hierarchical structure and a sub-structure of the second hierarchical structure;

receiving a predetermined user command associated with a particular field of the sub-structure of the second hierarchical structure, wherein the predetermined user command is a selection command of the articular field of the sub-structure of the second hierarchical structure; and in response to receiving the predetermined user command:

determining that the displayed first portion of the representation of the sub-structure of the first hierarchical structure comprises a hidden field mapped to the particular field of the sub-structure of the second hierarchical structure and expanding the first portion of the representation of the sub-structure of the first hierarchical structure until the at least on field mapped becomes visible; and determined that the displayed first portion of the representation of the first hierarchical structure comprises sub-structure with no field mapped to the particular field of the sub-structure of the second hierarchical structure and displaying, in the displayed area, a second portion of the representation of sub-structure of the first hierarchical structure comprising at least one field mapped to the particular field of the sub-structure of the second hierarchical structure, wherein the second portion of the representation of the sub-structure of the first hierarchical structure is displayed in the displayed area while at least a portion of the displayed first portion of the representation of the sub-structure of the first hierarchical structure is no longer displayed in the displayed area, after displaying the second portion the first hierarchical structure determining that the at least one field of the first structure mapped to the particular field of the first sub-structure of the second hierarchical structure is hidden, wherein the sub-structure of the first hierarchical structure includes a plurality of further fields sub-structure of the second hierarchical structure: and wherein on a hierarchical level of the at least one field mapped to the particular field of the expanding the second portion of the representation of the first hierarchical structure until the at least one field mapped to the particular field of the second hierarchical structure becomes visible includes: displaying a predetermined number of fields of the plurality of further fields on the hierarchical level of the at least one field mapped in the vicinity of the at least one field mapped to the particular field of the sub-structure of second hierarchical structure; and hiding the remaining fields of the plurality of further fields on the hierarchical level of the at least one field mapped in one or more sibling nodes.

18. A system comprising: one or more processors; and a non-transitory, computer-readable storage medium storing instructions executable by the one or more processors to perform operations comprising:

displaying a first portion of a representation of a first hierarchical structure and a first portion of a representation of a second hierarchical structure in a displayed area of a graphical user interface of a computing device, wherein each of the first hierarchical structure and the second hierarchical structure comprises a plurality of sub-structures that are selectively collapsible to hide a first portion of a plurality of fields and expandable to display a second portion of the plurality of fields, such that only parts of the respective hierarchical structure and sub-structure are expanded at a time to reduce a rendering load of a processor of the computing device, and the second hierarchical structure is a combination of the first hierarchical structure and at least one additional hierarchical structure;

displaying a representation of mappings between fields of a sub-structure of the first hierarchical structure and a sub-structure of the second hierarchical structure;

receiving a predetermined user command associated with a particular field of the sub-structure of the second hierarchical structure, wherein the predetermined user command is a selection command of the articular field of the sub-structure of the second hierarchical structure; and in response to receiving the predetermined user command:

determining that the displayed first portion of the representation of the sub-structure of the first hierarchical structure comprises a hidden field mapped to the particular field of the sub-structure of the second hierarchical structure and expanding the first portion of the representation of the sub-structure of the first hierarchical structure until the at least one field mapped becomes visible; and determining that the displayed first portion of the representation of the first hierarchical structure comprises sub-structure with no field mapped to the particular field of the sub-structure of the second hierarchical structure and displaying, in the displayed area, a second portion of the representation of sub-structure of the first hierarchical structure comprising at least one field mapped to the particular field of the sub-structure of the second hierarchical structure, wherein the second portion of the representation of the sub-structure of the first hierarchical structure is displayed in the displayed area, while at least a portion of the displayed first portion of the representation of the sub-structure of the first hierarchical structure is no longer displayed in the displayed area, after displaying the second portion of the first hierarchical structure determining that the at least one field of the first structure mapped to the particular field of the sub-structure of the second hierarchical structure is hidden, wherein the sub-structure of first hierarchical structure includes a plurality of further fields on a hierarchical level of the at least one field mapped to the particular of the sub-structure of second hierarchical structure; and wherein expanding the second portion of the representation of the sub-structure of the first hierarchical structure until the at least one field mapped to the particular field of the sub-structure of the second hierarchical structure becomes visible includes;

displaying a predetermined number of fields of the plurality of further fields on the hierarchical level of the at least one field mapped in the vicinity of the at least one field mapped to the particular field of the sub-structure of second hierarchical structure; and hiding the remaining fields of the plurality of further fields on the hierarchical level of the at least one field mapped in one or more sibling nodes.

* * * * *